(12) United States Patent
Tofano

(10) Patent No.: US 6,625,169 B1
(45) Date of Patent: Sep. 23, 2003

(54) INTEGRATED COMMUNICATION SYSTEMS FOR EXCHANGING DATA AND INFORMATION BETWEEN NETWORKS

(75) Inventor: Mark E. Tofano, Charlotte, NC (US)

(73) Assignee: TeleSys Technologies, Inc., Charlotte, NC (US)

(*) Notice: Subject to any disclaimer, the term of this patent is extended or adjusted under 35 U.S.C. 154(b) by 0 days.

(21) Appl. No.: 10/171,833

(22) Filed: Jun. 14, 2002

(51) Int. Cl.⁷ .................................................. H04J 3/16
(52) U.S. Cl. ...................................................... 370/466
(58) Field of Search ................................ 370/401, 402, 370/465, 466, 467

(56) References Cited

U.S. PATENT DOCUMENTS

| | | |
|---|---|---|
| 4,291,198 A | 9/1981 | Anderson et al. |
| 4,539,652 A | 9/1985 | Rubin |
| 4,551,832 A | 11/1985 | Carll et al. |
| 4,748,656 A | 5/1988 | Gibbs et al. |
| 4,817,086 A | 3/1989 | Oye et al. |
| 5,014,266 A | 5/1991 | Bales et al. |
| 5,179,586 A | 1/1993 | Lee |
| 5,181,239 A | 1/1993 | Jolissaint |
| 5,195,086 A | 3/1993 | Baumgartner et al. |
| 5,309,509 A | 5/1994 | Cocklin et al. |
| 5,329,579 A | 7/1994 | Brunson |
| 5,333,266 A | 7/1994 | Boaz et al. |
| 5,632,017 A | 5/1997 | Klein et al. |
| 5,790,546 A * | 8/1998 | Dobbins et al. ............ 370/400 |
| 6,026,088 A | 2/2000 | Rostoker et al. |
| 6,070,070 A | 5/2000 | Ladue |
| 6,101,170 A * | 8/2000 | Doherty et al. ............. 370/255 |
| 6,154,465 A | 11/2000 | Pickett |
| 6,181,694 B1 | 1/2001 | Pickett |
| 6,185,520 B1 | 2/2001 | Brown et al. |
| 6,198,920 B1 | 3/2001 | Doviak et al. |
| 6,208,658 B1 | 3/2001 | Pickett |
| 6,246,679 B1 | 6/2001 | Yamamoto |
| 6,266,340 B1 | 7/2001 | Pickett et al. |
| 6,266,341 B1 | 7/2001 | Suprenant et al. |
| 6,289,025 B1 | 9/2001 | Pang et al. |
| 6,292,482 B2 | 9/2001 | Pickett |
| 6,298,045 B1 | 10/2001 | Pang et al. |
| 6,343,074 B1 | 1/2002 | Pickett |
| 2001/0005379 A1 | 6/2001 | Pickett |
| 2001/0024440 A1 | 9/2001 | Pounds et al. |
| 2001/0050918 A1 | 12/2001 | Suprenant et al. |
| 2002/0001301 A1 | 1/2002 | Sarkissian et al. |
| 2002/0001302 A1 | 1/2002 | Pickett |
| 2002/0029302 A1 | 3/2002 | Hyder et al. |

OTHER PUBLICATIONS

PICMG (PCI Industrial Computer Manufacturing Group): "Compact PCI Packet Switching Backplane Specification", PICMG 2.16 Revision 1.0, Sep. 5, 2001.

(List continued on next page.)

*Primary Examiner*—Melvin Marcelo
(74) *Attorney, Agent, or Firm*—Frank J. Pita

(57) ABSTRACT

Integrated communication systems enabling data and information exchanges between various networks and various network formats are provided. In one embodiment, the communication system comprises a first network interface, a second network interface, a shared non-switched system bus, and a processor executing a computer software program. Data received into one network interface can be translated into a third format for transparent software switched transmission to the other network interface. In another embodiment, the communication system comprises a first network interface, a second network interface, and a processor. The processor further comprises an external interface and executes a computer software program. Network interface connection information received from at least one of the interfaces can be used by the processor to automatically establish a software switched logical connection for transmitting data between network interfaces. This Abstract is provided only for searching purposes as required by the U.S.P.T.O., and is not intended to narrow the scope of the present invention as defined by the attached claims in any way.

61 Claims, 11 Drawing Sheets

OTHER PUBLICATIONS

Somes, Dick: *"PCI Industrial Computer Manufacturers Group PICMG 'Open Platforms for Communications'"* Presentation at Bus and Board Meeting, Jan. 22, 2002, Long Beach, California, as printed from Internet web site URL www.busandboard.com/bab2002pres/bb–pdfs/t1–picmg.pdf.

Force Computer, Internet web page titled "Standards and Technologies, Industry Consortia PICMG" Printed from Internet web site published in 2000 and 2002 at www.force-computers.com/technology/viewTechnology.cfm?subList=1&detailView=picmg.

Andrews, Warren, "Serial Interconnect Schemes Not a Zero Sum Game" Publisher's Letter, RTC Magazine, Mar. 2001, from Internet at www.rtcmagazine.com.

Somes, Dick: *"CompactPCI: Ready for Multi–computing"* Article, RTC Magazine, Jun. 2001, from Internet at www.rtcmagazine.com.

Hill, Chuck, *"PICMG 'mesh' eyes any packet protocol"* Article, Eetimes Magazine, Jan. 17, 2001 from Internet at www.eetimes.com/printableArticle?doc_id+OEG20020117S0074.

* cited by examiner

Fig. 6 of 11
Fig. 6(a)
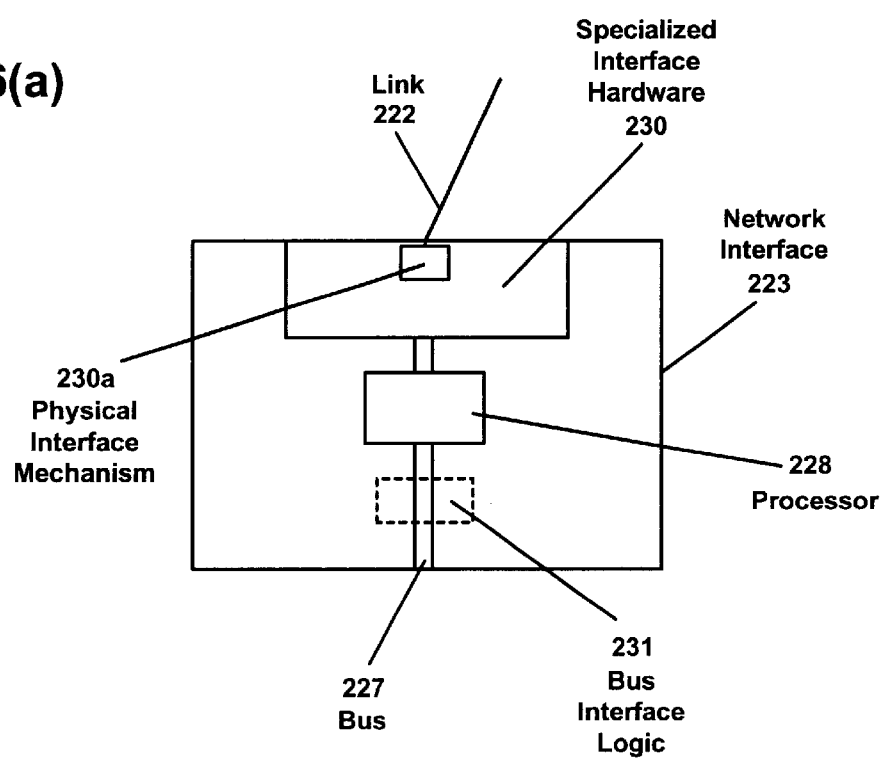
Fig. 6(b)
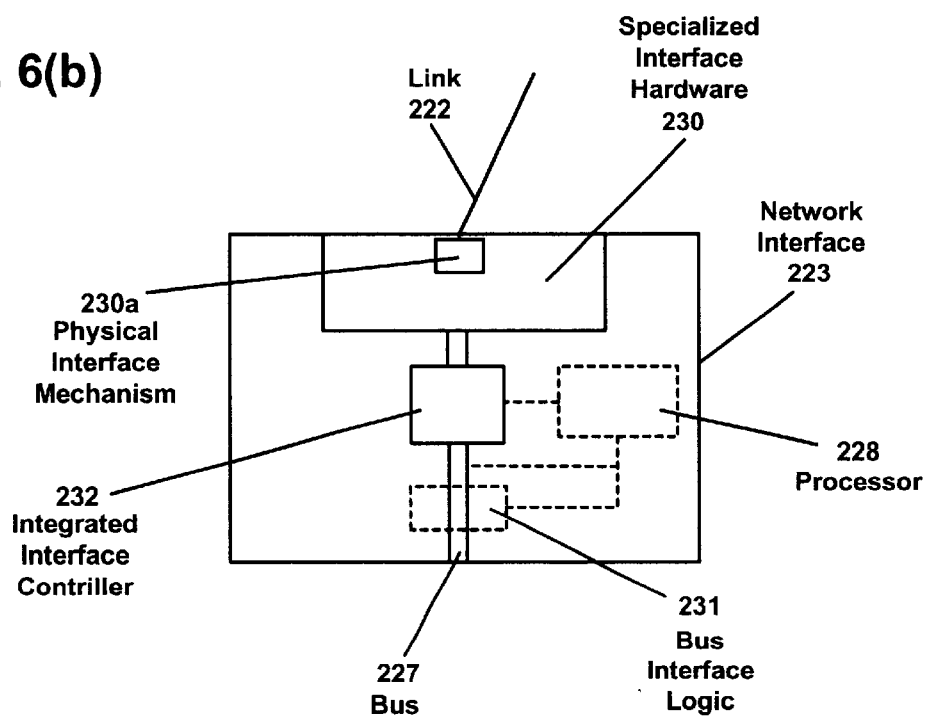

Fig. 7 of 11
Fig. 7(a)
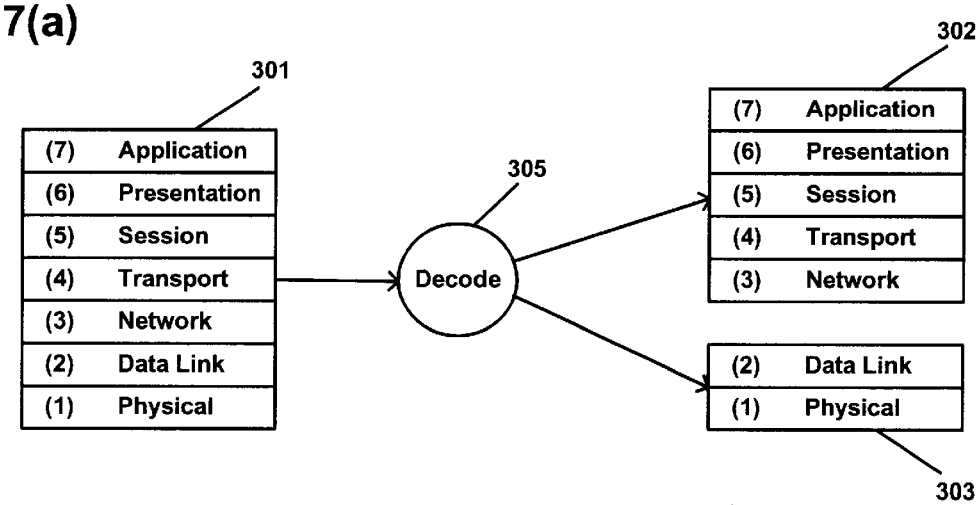
Fig. 7(b)
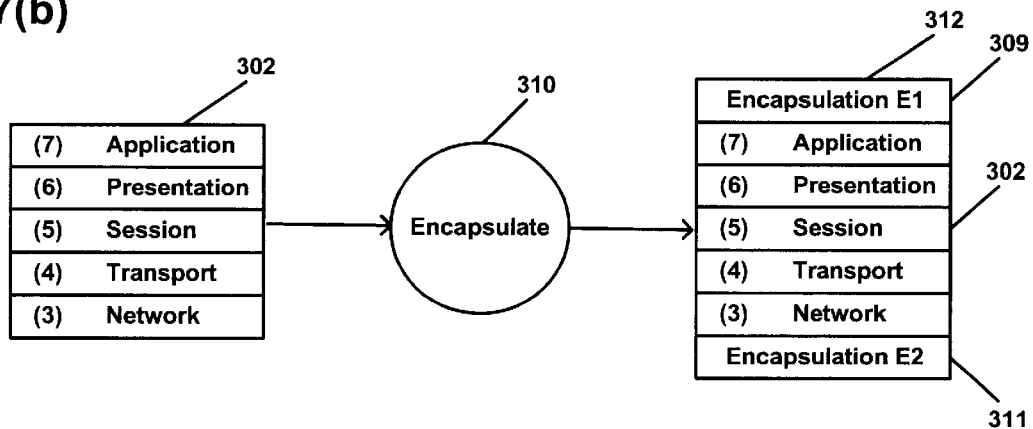

Fig. 8 of 11
Fig. 8(a)
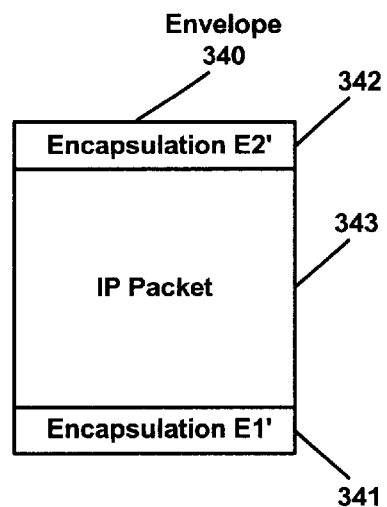
Fig. 8(b)
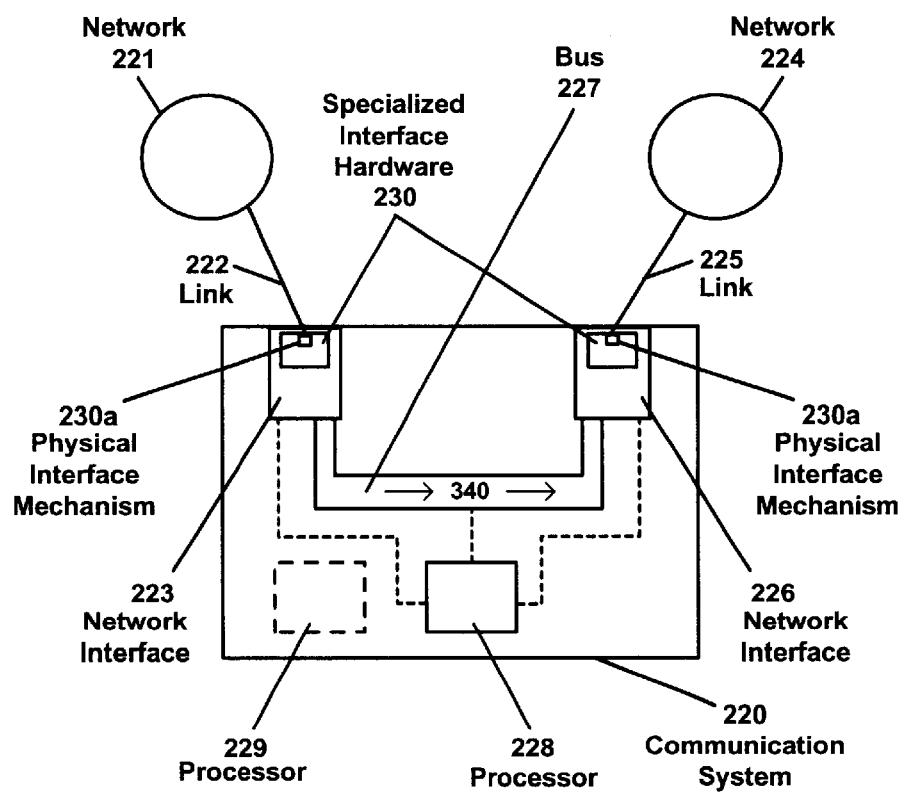

Fig. 9 of 11
Fig. 9(a)
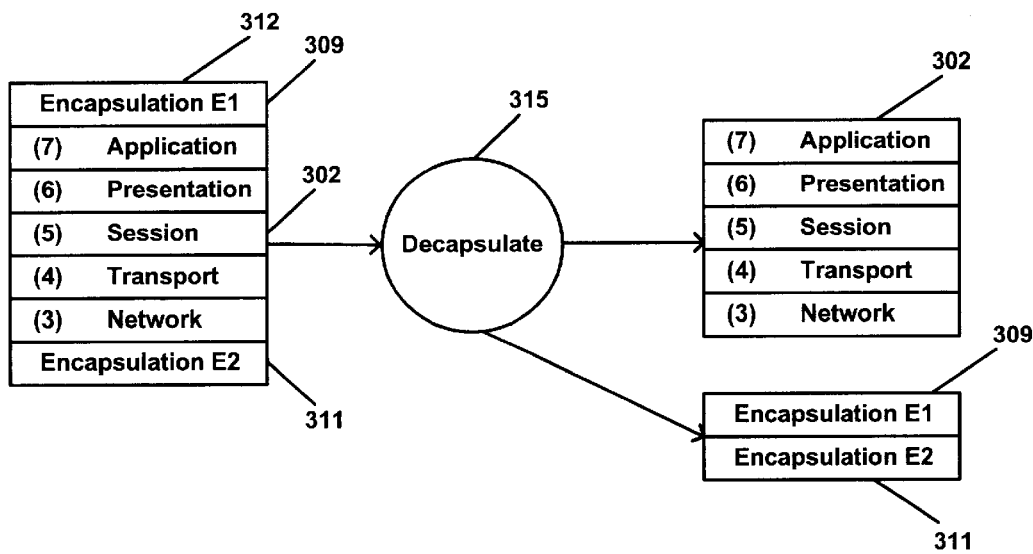
Fig. 9(b)
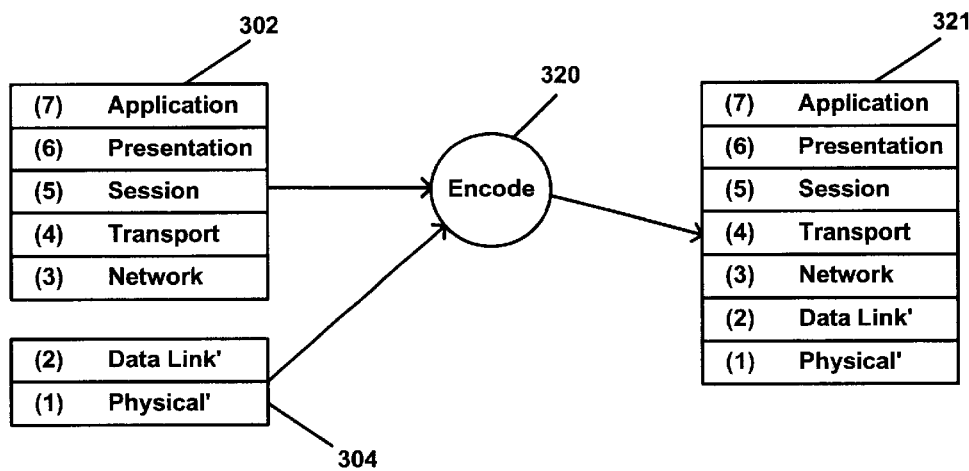

INTEGRATED COMMUNICATION SYSTEMS FOR EXCHANGING DATA AND INFORMATION BETWEEN NETWORKS

FIELD OF THE INVENTION

The present invention relates to networking, telecommunications, and communications technology, and more particularly to integrated communication systems for exchanging data and information between networks.

BACKGROUND OF THE INVENTION

The arts of networking and telecommunications originated well over a century ago with the advent of traditional wired telecommunications. Initially, the technologies required were relatively straightforward since a single telephony network carried information in a simple telegraph signaling data format. Later, a more elaborate telephone network capable of carrying voice information in an analog data format was developed. Eventually information in new and more complex analog data formats, such as facsimile and modem communication formats, was conveyed over telecommunications networks. Soon information in even more advanced digital data formats, such as ISDN for example, was also transmitted across telephony networks. New telephony networks were created, while more sophisticated network formats for transmitting data and information were developed. For instance, later the wireless telephony network joined the traditional wired or landline telephony network. Similarly, wireless telephony protocols emerged to convey information and data through wireless networks. Needless to say, the development of telecommunications created various new networks and new network formats. Network infrastructure devices, such as landline and wireless telecom switches, were designed to interface with distinct telephony networks and to address various network formats, such as the network protocols and network transports or media used to convey data and information through telephony networks.

However, this was only the beginning of the proliferation of networks and network formats used for transmitting data and information. Advances in data communications led to the emergence of Local Area Networks (LANs), such as Token Ring and Ethernet, that provided faster and improved networking communications between increasingly intelligent network terminal devices like PCs. New and increasingly diverse types of networks, network formats, network protocols, and network transports/media came to be deployed. Wide Area Networks (WANs), high-speed telephony networks (T1, T3, etc.), Metropolitan Area Networks (MANs), Asynchronous Transfer Mode (ATM) networks, fiber optic networks, broadband networks, and cable networks were examples of the new types of networks that emerged. New network formats, some corresponding to the newly developed networks were created. For example, Asymmetric Digital Subscriber Line (ADSL) network format, ATM network cell format, and IP network packet format are but a few of the many diverse network formats in use today. The emergence of Internet Protocol (IP, TCP/IP, and the like) networks and the Internet network further revolutionized networking and communications given how pervasively these sort of networks have been implemented. Network equipment has been developed not only to interface with a given network, but also to effectively interconnect different types of networks. For example, the landline and wireless telephony networks have been interfaced effectively through hybrid landline-wireless telephony switches. As a further example, the telephony network and Internet network have been productively interfaced using telecom/IP gateway servers. Further adding to the complexity, new types of information had to be conveyed through networks. Video information joined existing types of information such as voice information, facsimile information, and the like, being transmitted as analog data and digital data traffic on modem networks. Today a plethora of different networks, distinct network formats, various types of data and information, numerous protocols, and transports/media must all be addressed by the networking and telecommunications arts.

Consequently, numerous types of networking and communications systems were developed to address the need for interfacing between diverse networks and network formats. Communication systems were designed or adapted to interface with each new type of network. Other communication systems were developed to bridge or route data and information between different types of networks. As a result, typical network topologies for managing various and distinct networks have become extremely complex. It has become increasingly difficult to effectively interface diverse communication systems from different manufacturers found at the edges of different networks. The large number of communication systems to be managed, and the many different types of communication systems to be interfaced, make it difficult and inefficient to exchange data and information between networks and network formats. It would clearly be advantageous to have a single networking solution that could replace the plethora of network devices needed to effectively utilize different networks and different network formats. Further, a need exists for a flexible network solution that could seamlessly address different types of data and information embodied in various networks and network formats.

History indicates that additional networks and network formats may yet be developed. Thus, it would be advantageous to have an open communications architecture that could readily support new networks and network formats. In addition, there is a need for a single networking solution that can be controlled remotely in an open networking environment. Addressing at least some of these needs would enable new applications for networks, and could permit more productive use of the many networks and network formats encountered in modem communications and networking. Note that this Background of the Invention is provided merely for explanatory purposes, and is not intended to limit the scope of the present invention as defined by the attached claims in any way.

SUMMARY OF THE INVENTION

The present invention provides communication systems seeking to address at least some of the above needs while attempting to deliver one or more of the above advantages. More specifically, the present invention provides integrated communication systems that enable data and information exchanges between various networks and various network formats. The present invention also provides integrated communication systems that allow different types of data and information to be intelligently controlled, translated, interconnected, and reconciled. As a result, the present invention makes it possible to reduce the number and types of network equipment that may be required to exchange data and information, thereby enabling simplified network configurations and management. Integrated communication systems provided by the present invention embody an open hardware and software architecture. Therefore, the communication systems of the present invention can readily support, reconcile, and integrate networks and network formats, whether existing or new. Yet further, the integrated communication systems of the present invention leverage their open architecture to permit external configuration and external control of the integrated communication system. Accordingly, the present invention endeavors to effectively service the plethora of networks, network formats, and types of data and information. Existing applications for networks, as well as new applications for networks, may be productively supported by the present invention. The integrated communication systems of the present invention make it possible to provide a single, coordinated, enterprise-wide networking solution supporting the exchange of data and information of various types between numerous networks and numerous network formats.

In one embodiment, the present invention provides a communication system for exchanging data between networks. This communication system comprises a first network interface, a second network interface, a shared non-switched system bus, and a processor. The first network interface is connected to a first network and exchanges data in a first network format with the first network. In a similar manner, the second network interface is connected to a second network and exchanges data in a second network format with the second network. Further, the shared non-switched system bus connects the first network interface and the second network interface. The processor is operably connected to at least one of the first network interface, the second network interface, and the shared non-switched system bus. In addition, the processor executes a software program therein for translating between at least one network format and a third format. Data received into one of the network interfaces, such as into one of the first network interface and the second network interface, is translated from the network format as it was received from the one network into a third format. The third format may be used for software switched transmission within the communication system from the one network interface to the other network interface. Accordingly, the third format may thereby serve as a transparent format used to exchange data between network interfaces. Optionally, data can be translated from the third format into the other network format for transmission to the other network through the other network interface, providing transparent transfers between one network and another network. Various other related embodiments are disclosed.

Another embodiment of the present invention provides a communication system for exchanging data between networks. The communication system comprises first interfacing means, second interfacing means, shared non-switched means, and processing means. First interfacing means are provided for interfacing with a first network to exchange data in a first network format with the first network. In addition, second interfacing means for interfacing with a second network to exchange data in a second network format with the second network are provided. Shared non-switched means for connecting the first interfacing means and the second interfacing means are also provided. Lastly, the communication system provides processing means for translating between at least one network format and a third format. The processing means are operably connected to at least one of the first interfacing means, the second interfacing means, and the shared non-switched means for connecting. Data received into one interfacing means, such as into one of the first interfacing means and the second interfacing means, can be translated from the network format as received from the one network into a third format. The third format may be used for software switched transmission from the one interfacing means to the other interfacing means. In effect, the third format can thereby serve as a transparent format used to exchange data between interfacing means. As before, data may optionally be translated from the third format into the other network format for transmission to the other network through the other interfacing means. Accordingly, transparent data transfers between networks may be provided. Additional related embodiments are provided by the present invention.

The present invention provides yet another embodiment of a communication system. For this embodiment, the communication system for exchanging data between networks comprises a first network interface, a second network interface, and a processor. The first network interface is connected to a first network and exchanges data in a first network format with the first network. Similarly, the second network interface is connected to a second network and exchanges data in a second network format with the second network. The processor further comprises an external interface, and the processor executes a computer software program therein. Furthermore, the processor is operably connected to at least one of the first network interface, the second network interface, and the external interface. In addition, the processor receives network interface connection information from at least one of the external interface, the first network interface, and the second network interface. The processor can use this received network interface connection information for automatically establishing a software switched logical connection, without user intervention, between the first network interface and the second network interface. Data may be received by one network interface, such as by one of the first network interface and the second network interface. The received data may be transmitted within the communication system through the software switched logical connection between the one network interface receiving data and the other network interface, without further processor intervention. In essence, the data transmission can occur independently of the processor after the processor establishes the software switched logical connection between network interfaces. Data may then be transmitted to the other network through the other network interface. Accordingly, data can be software switched between networks using network interface connection information received by at least one processor of the communication system. This embodiment does not require, but can optionally use, a shared non-switched bus for transmitting data between network interfaces. Other related embodiments provided by the present invention are disclosed.

In another embodiment, the present invention provides a communication system for exchanging data between networks. The communication system of this embodiment comprises first interfacing means, second interfacing means, and processing means. Specifically, the communication system provides first interfacing means for interfacing to a first network and exchanging data in a first network format with a first network. Further, second interfacing means for interfacing to a second network and exchanging data in a second network format with a second network are provided. The communication system provides processing means for processing information or data. In addition, the processing means further comprises external interfacing means and is operably connected to at least one of the first interfacing means, the second interfacing means, and the external interfacing means. The processing means receives interfacing means connection information from at least one of the first interfacing means, the second interfacing means, and the external interfacing means. The interfacing means connection information may be used by the processing means for automatically establishing a software switched logical connecting means, without user intervention, between the first interfacing means and the second interfacing means. Data can be received by one interfacing means, such as by one of the first interfacing means and the second interfacing means. The received data may be transmitted within the communication system through the software switched logical connecting means established between the one interfacing means and the other interfacing means, without further processing means intervention. In effect, the data transmission may occur independently of the processing means after the processing means establishes the software switched logical connecting means between interfacing means. The other interfacing means may thereafter transmit data received from the one interfacing means to the other network. In essence, data can be software switched between networks using interfacing means connection information received by processing means of the communication system. This embodiment does not require, but can optionally use, shared non-switched means for connecting the interfacing means. Additional related embodiments provided by the present invention are disclosed.

The communication systems of the present invention can support exchanges of data and information between networks. The present invention can provide integrated enterprise-wide network solutions for addressing various types of data, various networks, and various network formats. As such, the present invention attempts to satisfy some of the above stated needs while seeking to deliver some of the advantages noted previously. In one sense, the present invention provides communication systems that can use a common internal format, such as the third format, to transparently exchange data and information between network interfaces. In another sense, the present invention herein provides communication systems that can software switch and exchange data and information between network interfaces under external control. In either or both senses, the present invention can simplify interfacing with a variety of networks and network formats and exchanging data and information therebetween. The Summary of the Invention is provided herein as an overview of the invention and is not intended to limit the scope of the present invention as defined by the attached claims in any way. Other aspects and features of the present invention will become apparent to those of ordinary skill in the art, upon review of the following description of specific embodiments of the present invention in conjunction with the accompanying figures.

BRIEF DESCRIPTION OF THE FIGURES

FIG. 6, including FIGS. 6(a) and 6(b), which are diagrams illustrating some examples of possible network interface and processor configurations, according to various embodiments of the present invention.

FIG. 7, including FIGS. 7(a) and 7(b), which are diagrams illustrating format translations, including decoding and encapsulation respectively, according to embodiments of the present invention.

FIG. 8, including FIGS. 8(a) and 8(b), which are diagrams illustrating an IP packet encapsulated in a PCI bus format and the transfer of an encapsulated IP packet over the PCI bus respectively, according to some embodiments of the present invention.

FIG. 9, including FIGS. 9(a) and 9(b), which are diagrams illustrating inverse format translations, including decapsulation and encoding respectively, according to several embodiments of the present invention.

The Brief Description of the Figures above and the following Detailed Description of the Invention are provided for illustrative and descriptive purposes only, and neither is meant to limit the scope of the present invention as defined by the attached claims in any way.

DETAILED DESCRIPTION OF THE INVENTION AND BEST MODE

The present invention now will be described more fully hereinafter with reference to the accompanying illustrative figures, in which various embodiments of the invention are shown. This invention may, however, be embodied in many different forms and should not be construed as limited to the embodiments set forth herein; rather, these embodiments are provided so that this disclosure of the present invention will be thorough and complete, and will fully convey the scope of the invention to those skilled in the art. Although specific terms are employed herein, they are used in a generic and descriptive sense only and not for purposes of limiting the scope of the present invention as defined by the attached claims in any way. Some terminology will be defined herein and used to describe forthcoming embodiments of the present invention, in order to teach the present invention to those skilled in the art. Terms not described explicitly in this disclosure should be construed as they would be by those skilled in the art. Like numbers refer to like elements throughout the detailed description of the present invention.

As described above, modern networking and telecommunications are characterized by an overabundance of different networks, distinct network formats, numerous protocols, various types of transport media, and different types of data and information. As used herein for purposes of describing the present invention, data comprises analog data, digital data, both, or the like. Further, as used herein information comprises a set of related data having some collective significance or meaning. For instance, image or picture information may be represented as a group of digital data, such as a set of pixels, that define the size and color of an image. Information may be embodied in one or more forms of data, such as in analog data, in digital data, or in both forms of data. For example, audio or music information may be represented as analog data, digital data, or both forms in combination. For purposes of describing the present invention, information and data are functionally equivalent and can be viewed as interchangeable. This is the case not only since data and information are related as noted, but also because the operation of the integrated communication systems of the present invention can exchange and reconcile data and information in whatever form or forms may be required.

Figure 1:
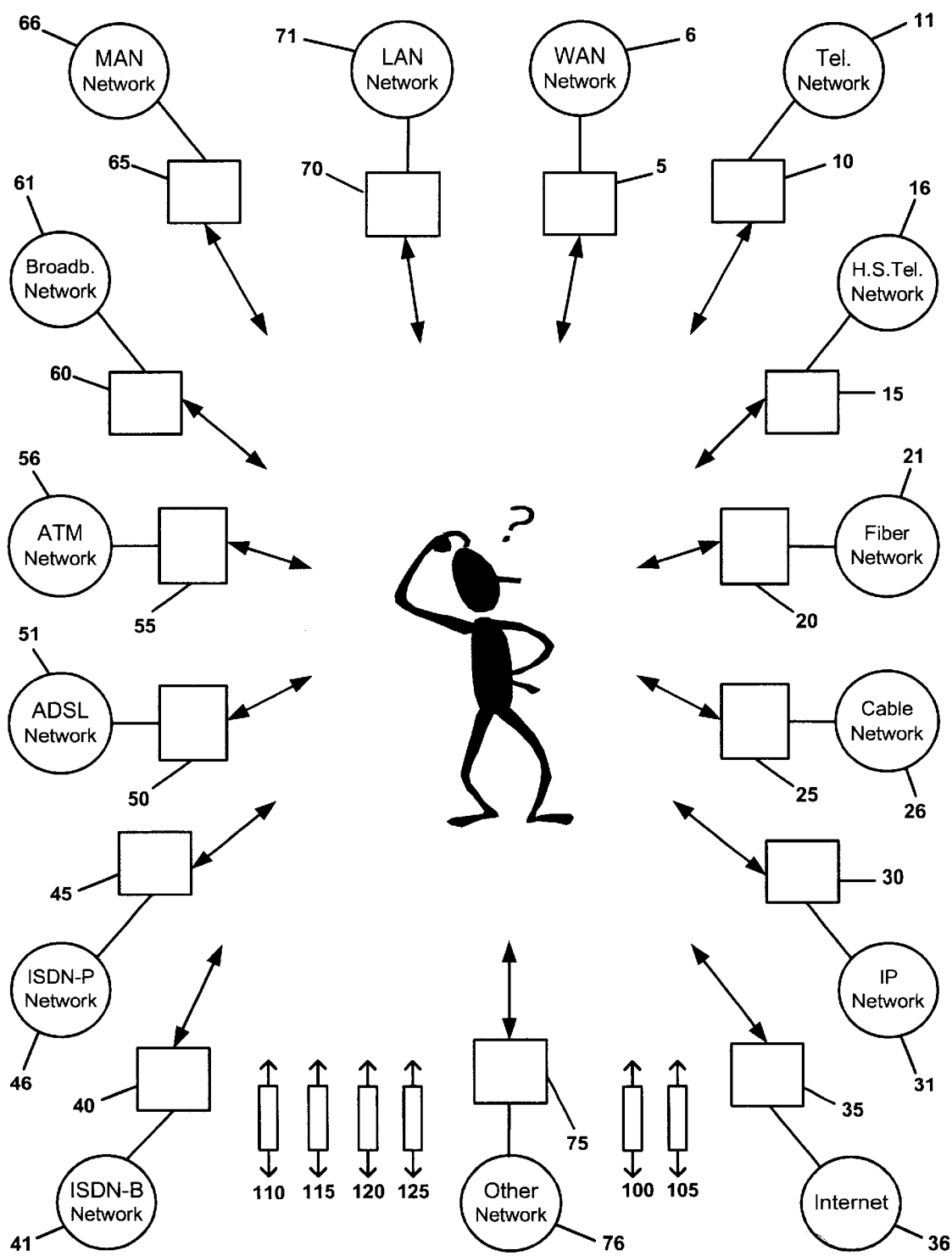
FIG. 1 is a diagram illustrating the complexities inherent in the multi-network, diverse data and information networking and communications environment encountered by those skilled in the art.

FIG. 1 illustrates some of the complexity inherent in the networking and communications environment faced by those skilled in the art. The Figure accordingly shows at least some of the many different types of networks, representing the varied network formats, protocols, and transports/media embodied therein that must be addressed. For instance, WAN network 6, telephony network 11, high-speed telephony network 16, fiber network 21, cable network 26, IP network 31, and the Internet network 36 are shown. Note that some of the networks shown could be viewed as composed of one or more other networks. For instance, the telephony network may include both wired and wireless telephony networks. The Figure further shows ISDN basic rate interface network 41, ISDN primary network 46, ADSL network 51, ATM network 56, broadband network 61, MAN network 66, and LAN network 71 therein. Additionally, other networks 76, both existing and yet to be developed must be addressed in the environment. Typically at the edge of each network, some communication system provides an interface between one or more types of networks. In the Figure, edge of network communication systems are shown for each network, numbered respectively from 5 for a WAN network to 75 for the other networks. For example, a router may be used to interface a LAN network to a WAN network. Such router could serve as communication system 5 for interfacing a WAN network 6 to a LAN network such as 71. Similarly, communication system 70 could be a router for interfacing a LAN network 71 to WAN network 6, for example.

In some cases, edge of network communication systems may be used to interface more than two networks. As shown in FIG. 1, the generally "unintegrated" ad hoc approach used for interfacing networks has unfortunately resulted in the creation of a plethora of communication systems for interfacing the numerous networks and respective formats found in today's environment. Further complexity is encountered when it becomes necessary to interconnect several communication systems together in order to interface the required networks. For example, to interconnect telephony network 11 to cable network 26 and IP network 31 it may be necessary to interface communication systems 10, 25, and 30 together in some complex configuration, possibly even requiring additional intervening communication systems. Since existing communication systems are designed to interface a relatively limited set of networks and their associated network formats or data formats, the proliferation of network edge communication systems continues to increase. As discussed earlier and illustrated in FIG. 1, the current environment is fraught with complexity given the large number and types of communication systems being used to interface distinct networks, network formats, and types of data and information that must be addressed.

Accordingly FIG. 1 illustrates that the networking and communications environment needs to consider and effectively manage different types of information and forms of data. More specifically, the very reason for creating networks such as those shown in the Figure is to convey data and information. Thus, communication systems and their associated networks, like the examples shown in the Figure, may need to convey analog data 100, and digital data 105 for example. Additionally, these systems and networks may for example also need to convey audio information 110, image information 115, video information 120, and other information 125. Some examples of other information could be computer commands, network or communication commands, computer executable files, computer parameter files, IP packets, other packet or cell formats, or the like. Of course, as those skilled in the art will realize, there may be additional examples of information or data. Conventional communication systems may encounter problems processing different types of information or different forms of data. One cause of these problems is that existing communication systems do not process or convey different forms of data and information in a common, efficient manner. This disadvantage further complicates network configurations and the resulting network environment because a greater number of communication systems are required to translate and convey diverse types of information and forms of data through networks.

Figure 2:
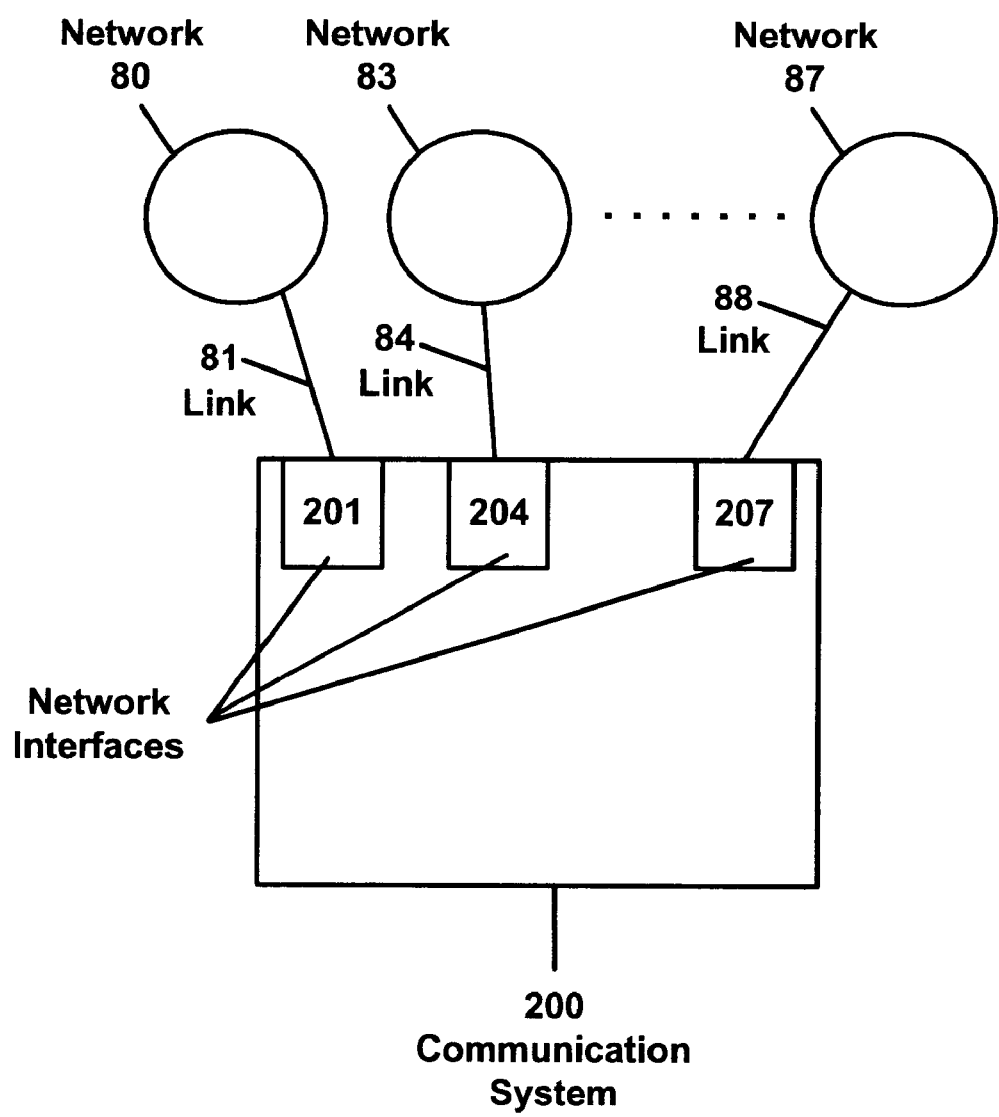
FIG. 2 is a block diagram illustrating a communication system for transparent exchanges between networks, according to one embodiment of the present invention.

Fortunately, the present invention provides communication systems that attempt to address the complexity found in today's networking and communication environment. The present invention thereby provides some embodiments of communication systems that can perform translations between network formats and can transparently exchange data and information between networks. Other embodiments of communication systems provided by the present invention can be externally controlled and directed to exchange data and information between networks. The example embodiment of the communication system in shown FIG. 2 could accordingly support transparent exchanges, or be externally controlled, or both. FIG. 2 accordingly illustrates one embodiment of a communication system according to the present invention. In this schematic representation, communication system 200 interfaces directly with various networks, for example network 80, network 83, network 87, and other networks as shown in the Figure. Of course, the communication system can interface with significantly more networks than the three examples shown in this Figure. Communication system 200 is integrated since it can directly connect to and interface with a number of networks without requiring intervening network specific communication systems, such as those edge of network communication systems shown in FIG. 1. Accordingly, the present invention can greatly reduce the complexity required to interface with various networks.

Networks 80, 83, and 87 interfaced to communication system 200 in FIG. 2 each could be any of the networks shown in FIG. 1. Alternatively, networks 80, 83, and 87 each could be other existing networks, or other yet to be developed networks, such as other networks 76 shown in FIG. 1. Networks 80, 83, and 87 shown in this Figure could be different networks each having their respective network formats, such as their respective protocols and transport media. For example, network 80 could be a telephony network, while network 83 can be the Internet or an IP network, and network 87 could be any other network. Alternatively, at least one of networks 80, 83, and 87 could be a different type of network. Thus, two of the networks 80, 83, and 87 could be IP networks while one of the networks could be a telephony network, for example. Additionally, some or all of networks 80, 83, and 87 could be the same type of network, with identical network formats. For instance, networks 80, 83, and 87 could all be IP networks with matching network model layers. Yet further, there could be differences in one or more network model layers between networks 80, 83, and 87. For example, two of the networks 80, 83, and 87 could be IP networks running on coax cable while the other could be a wireless IP network. In addition, the communication systems of the present invention can interface with data and information in the same format, or with data and information in different formats. For example, analog voice data received into the communication system from one network could be transmitted to another network as the audio portion of digital video information. There are many possible permutations and combinations of types of networks, network formats, and formats of data and information that can be interfaced to the communication systems of the present invention, such as to the embodiment of communication system 200, for instance.

As shown in FIG. 2, network 80 can be connected to communication system 200 through link 81. More specifically, network interface 201 of communication system 200 is used to interface to network 80 through link 81. Similarly, network 83 may be connected to network interface 204 of the communication system through link 84, and network 87 can be connected to network interface 207 of the communication system through link 88 respectively. For the present invention, a link at a minimum could comprise the physical media disposed between a network and a network interface of the communication system. For example, a link could comprise fiber, cable, wire, air, or any other media used to exchange data between a network and a network interface. Alternatively, a link may be defined by the data link layer or by one or more other layers of the network layer model associated with the network attached to a given network interface. Further, each network uses a given network format to communicate through the given link with an associated network interface of the communication system. For example, if network 80 was a telephony network, a telephony format such as all or some part of the SS/7 network layer model, could be used to communicate with the communication system. For instance, if network 83 was either the Internet or an IP network, a TCP/IP format such as all or some part of the TCP/IP network layer model, could be used to communicate with the communication system. As a further example, network 87 could use all or some part of the OSI network layer model as its network format to communicate with the communication system. In any case, each network can exchange information, data, or the like, in a given network format with the communication system through a link connected to a corresponding network interface.

When a communication system according to some embodiments receives data or information from a given network in a given network format through a network interface, it can translate the received data or information from the received network format into a common transparent format. The communication system can use this common transparent format for efficiently transporting data or information under software control as required within the communication system. This common transparent format may be used to efficiently switch or direct the data or information received from one network interface transparently through the communication system to another network interface. A common transparent format therefore allows data or information in any form and in any network format to be processed and conveyed transparently through the communication system, more specifically between network interfaces. Once data or information is transmitted to an outbound network interface in the common transparent format, the communication system can inverse translate data or information from the common transparent format into an outbound network format. Note that the received network format and the outbound network format may be different or may be the same. Once represented in the outbound network format, data or information can thereafter be transmitted through the outbound network interface to the attached network. Therefore, the communication system allows data or information in any form to be processed and conveyed transparently through the communication system to support "end to end" exchanges of data and information between networks. As such, data and information in any form, and in various diverse network formats, can be processed and exchanged between networks in a common, efficient, and integrated manner by the communication systems of the present invention.

A communication system according to some embodiments of the present invention can be externally controlled with respect to exchanging data between networks. Connection information may be received from some network interface or other external interface of the communication system. For example, the connection information could comprise information indicating which network interfaces attached to respective networks are to exchange data and information therebetween. The connection information can be used to establish externally controlled data and information exchanges between networks, through their respective network interfaces. The source of the connection information can use information about the types of networks or formats of data and information attached to the communication system, to intelligently reconcile and control exchanges of data and information between the desired networks. Accordingly data and information in any form, and in various diverse network formats, can be reconciled and exchanged between networks in an intelligent and integrated manner by the communication systems of the present invention.

Figure 3:
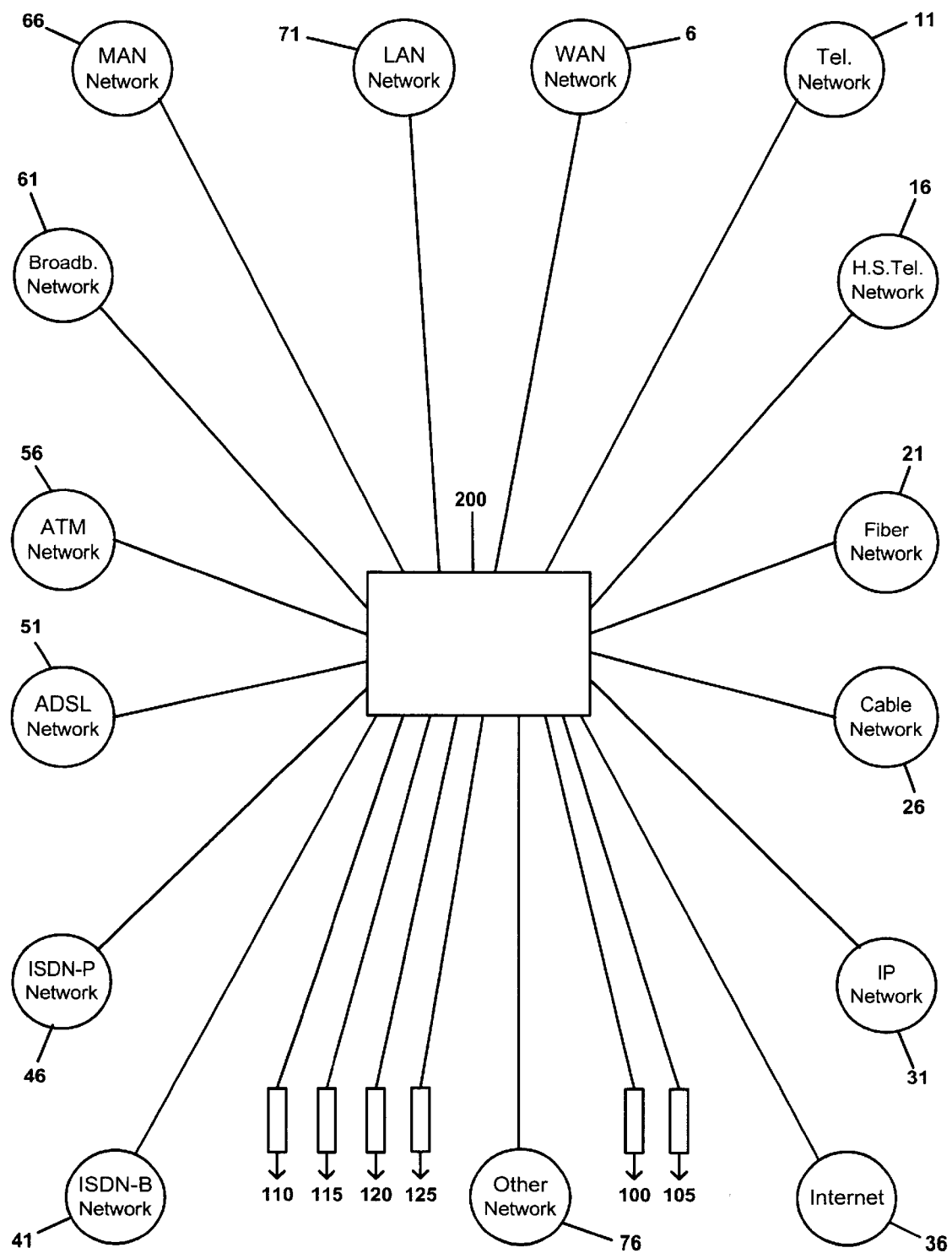
FIG. 3 is a diagram illustrating how the communication systems of the present invention attempt to address the complexity inherent in the multi-network, diverse data and information networking and communications environment.

FIG. 3 helps illustrate the advantages provided by the present invention. As before, the example embodiment of the communication system in shown FIG. 3 could accordingly support transparent exchanges, or be externally controlled, or both. This Figure shows how the communication system 200 embodiment described in FIG. 2 attempts to simplify the complex networking and communications environment described in FIG. 1. It is noted that the numerous intervening edge of network communication systems required in FIG. 1, such as communication systems 5 through 75 of FIG. 1, are no longer required in FIG. 3. Instead, a number of disparate edge of network communication system and other communication systems that may be required are replaced by a single integrated communication system 200. The single communication system includes a number of network interfaces adapted for interfacing with many networks, such as for interfacing with at least the examples of networks shown in FIGS. 1 and 3. In addition, the integrated communication system can directly interface with data in various forms and different types of information as shown. The networking complexity of the environment in FIG. 3 as compared with FIG. 1 is reduced significantly because a single integrated communication system can transparently interface and manage exchanges of different forms of data and different types of information between a number of diverse networks and diverse network formats.

Figure 4:
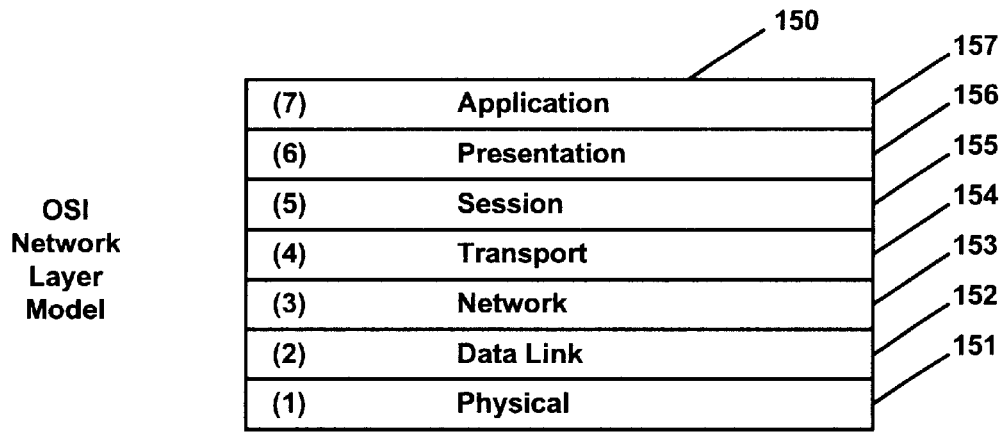
FIG. 4 is a block diagram illustrating the OSI network layer model, the TCP/IP network layer model, and the SS/7 network layer model, as examples of the diverse networks and network formats encountered in the networking and communications environment.
Figure 4:
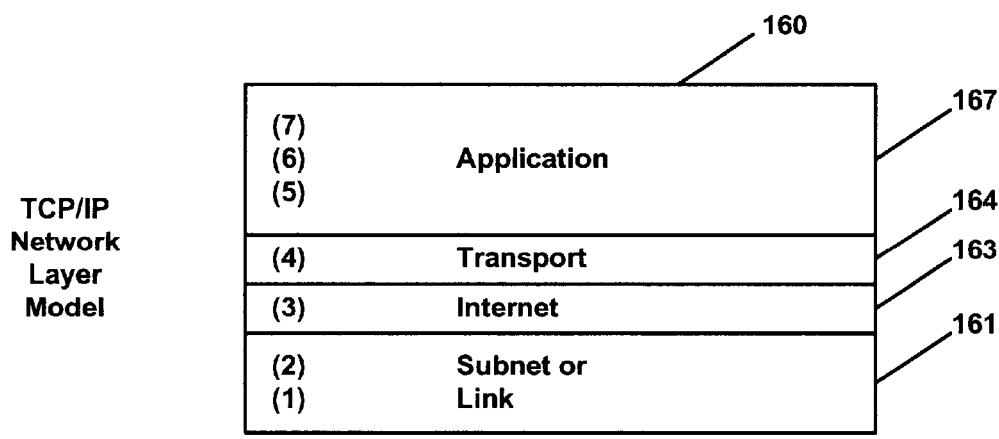
Figure 4:
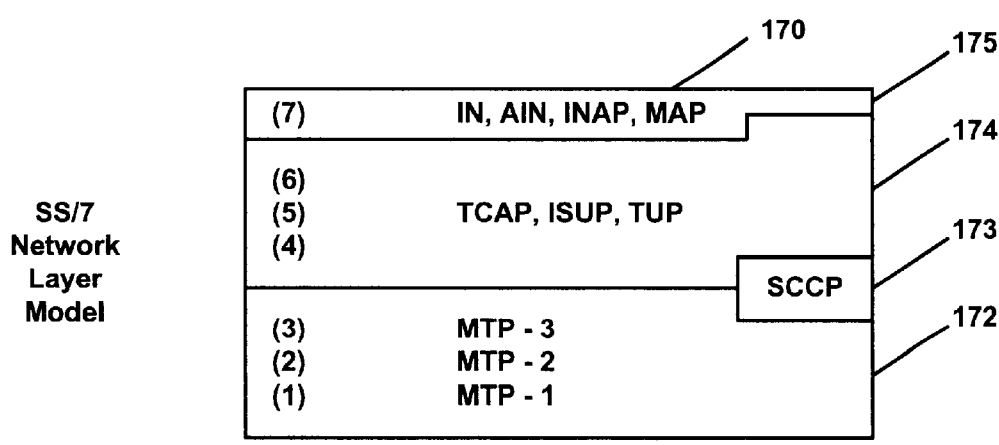

Using FIG. 4, the capability of the integrated communication systems of the present invention to support transparent exchanges of diverse data and diverse information while interfacing with different networks and network formats may be further explained. This Figure illustrates some examples of network layer models, also known as network protocol stacks to those skilled in the art. Network layer models were developed to support the transfer of data and information through one or more networks having a network format corresponding to a network layer model. Further, network layer models are used to establish some consistency across implementations of a given type of network. The network layer model mappings between networks are of course approximate, since in practice the boundaries between network layers may not always be clear and precise. Also, there may be different ways to represent some network layers and the functions they perform for a network. FIG. 4 illustrates the OSI network layer model 150, the TCP/IP network layer model 160, and the SS/7 network layer model 170. The OSI model 150 was created as the most general network layer model, which can serve as a reference model for comparison purposes. Accordingly, the OSI model is useful for explaining functions required of networks, and how those functions map to network layers of a particular type of network. The seven layers of the OSI model represent examples of the functions required in a typical network, regardless of how those functions are implemented in the network layer model of a given network.

The OSI model shown in FIG. 4 comprises 7 layers: Physical 151, Data Link 152, Network 153, Transport 154, Session 155, Presentation 156, and Application 157. Each layer may represent one or more functions provided by networks. In the OSI model, the Physical layer 151 is referred to as layer 1, the lowest layer of the model. The Physical layer 151, also called the media layer or network transport layer, provides the mechanical, electrical, and functional facilities for physically transmitting bits between networked devices. In essence, the physical layer transforms bits into electromagnetic signals to be physically transmitted between network devices through a particular transport media, such as through air or space, through a cable, fiber, wire, or the like. The physical layer can define the electromagnetic representation of data as well as the media used to transmit data between network devices. For example, analog data transmitted wireless or digital data transmitted through coax could be distinguished by the characteristics of the physical layer. Layer 2, the Data Link layer 152, also known as the Protocol layer, controls transmissions made through the physical layer, while detecting and correcting transmission errors to ensure error free, end-to-end transmissions between networked devices. Network layer 153, the third network layer, controls the operation of the data link and physical layers while providing higher level services such as routing and congestion control for transmissions. The Transport layer 154, layer 4, creates and maintains the logical end-to-end connection between network devices in a transparent manner so the right data arrives at the destination network device in the right order. Note that the Transport layer is distinguished in function from the Physical layer that describes the physical media or "network transport" as described above. The Session layer 155 shown as layer 5 establishes, manages, and ends connections between software applications running in networked devices. Layer 6, the Presentation layer 156, translates data between the network format and the application format to ensure transparency of data vertically through the protocol stack. Lastly, the seventh Application layer 157 supports application specific end user processes and software programs. For comparison purposes, the correspondence between the functions provided by the seven layers of the OSI reference model and the layers of the TCP/IP and SS/7 models is shown by overlaying OSI reference model layers (1) through (7) onto the layers of the TCP/IP and SS/7 network models.

The TCP/IP network layer model 160 is shown accordingly in FIG. 4. The Subnet or Link layer 161 corresponds approximately to layers 1 and 2 of the OSI reference model, the physical and data link layers respectively. Internet layer 163 corresponds to the network layer, the third layer. In this case, the Internet layer corresponds to the "IP" in TCP/IP, which describes the lower layers of the network as being an IP network. Note that as used herein, an IP network is not limited exclusively to the TCP/IP implementation and may include UDP/IP as well as other implementations of IP networks. Further, for purposes of the present invention an IP network could comprise the Internet or other IP networks. Transport layer 164 maps directly to the OSI transport layer in this example. However, Application layer 167 of the TCP/IP stack corresponds roughly to OSI layers 5, 6, and 7, or to the session, presentation, and application layers respectively.

The SS/7 network layer model 170 also shown in FIG. 4 maps differently to the OSI reference model. Here, several layers do not provide functions that map directly to discrete layers of the OSI model or TCP/IP model. Some layers, such as SCCP 173, may be described as functionally spanning layers 172 and 174 approximately, for example. The SCCP layer appears to have some functions of the OSI network layer and the OSI transport layer. Further, the TCAP, ISUP, and TUP layers 174 operate similarly to OSI layers 6 and 5, as well as similar to parts of OSI layers 7 and 4. As such, TCAP, ISUP, and TUP function to some extent like at least parts of the OSI application, presentation, session, and transport layers. It is worth noting that regardless of how the layers are organized for a given network layer model, each network model and in essence each network, must provide at least some of the seven network layer functions defined in the OSI reference model. The network format of a particular network is defined by the particular implementation of these network functions across the set of network layers used in a particular network. Interfacing different networks may require translations and inverse translations between network formats such that the associated network functions can be provided. In any respect, some embodiments of the communication systems of the present invention can interface intelligently with networks by providing the necessary translations required for transparently exchanging data and information between networks.

Figure 5:
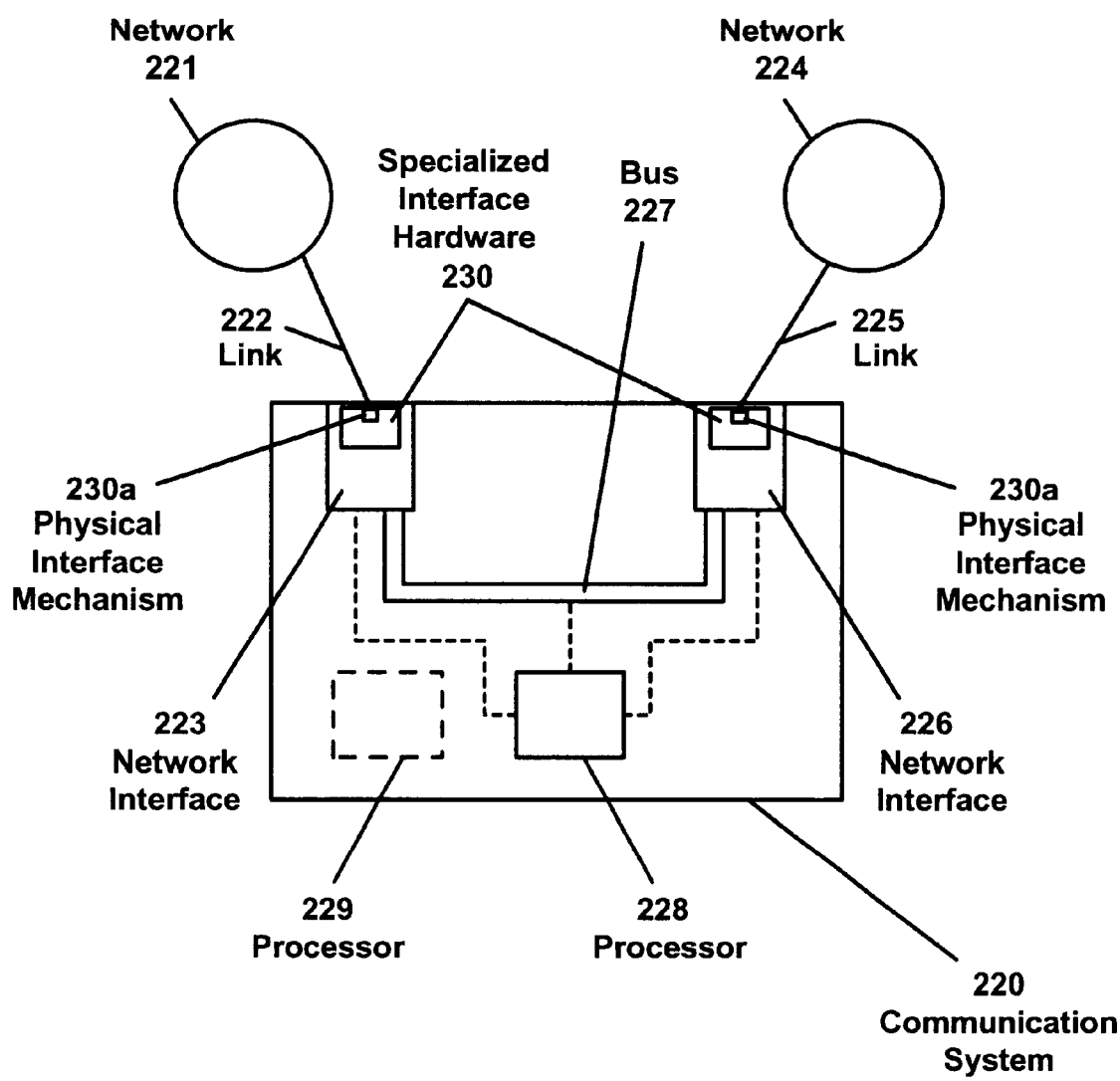
FIG. 5 is a block diagram illustrating a communication system for transparent exchanges between networks, according to some embodiments of the present invention.

FIG. 5 illustrates another embodiment of a communication system according to the present invention. More particularly, the Figure shows a communication system 220 for exchanging data and information between networks. As discussed, this embodiment of the communication system can be viewed as an integrated system supporting transparent exchanges of data and information between networks. The communication system comprises a first network interface 223, a second network interface 226, a shared non-switched system bus 227, and a processor 228. Each network interface, such as 223 and 226, includes a physical interface mechanism 230a for connecting with an attached network; such as through links 222 and 225 connecting to networks 221 and 224 respectively. Optionally, each network interface may include specialized interface hardware 230 as may be required to interface with a given attached network. Of course, those skilled in the art will recognize that the communication system may comprise more than two network interfaces, as well as other types of external interfaces. The first network interface 223 is connected to a first network 221 through link 222 as shown, and exchanges data in a first network format with the first network. Similarly, the second network interface 226 is connected to a second network 224 through link 225 as shown, and exchanges data in a second network format with the second network. A link, such as 222 or 225, may at a minimum define or include the physical layer, such as the media or network transport, disposed between an interface of the communication system and an attached network or networked device. Optionally, a link may include or define both the physical layer and the data link layer of an attached network. Alternatively, a link may include or define some number of network model layers or equivalents thereof for a given network attached to an interface of the communication system. The shared non-switched system bus 227 operably connects the first network interface 223 and the second network interface 226. In addition, the processor 228 is operably connected to at least one of the first network interface 223, the second network interface 226, and the shared non-switched system bus 227.

Further, the processor 228 executes a suitable software program therein for translating between at least one network format, such as between at least one of the first network format and the second network format, and a third format. The processor executing a suitable software program, in conjunction with other facilities of the communication system such as network interfaces and the third format, helps to provide intelligent and transparent exchanges between networks while reconciling different forms of data, different types of information, and different network formats. Data or information may be received into one network interface, such as into one of the first network interface 223 and the second network interface 226. The received data or information can be translated from the network format as received from the one network into a third format. The third format can be used to support software switched transmission of the data or information received from the one network interface to the other network interface. Software switched transmission of data may occur directly from one network interface to the other network interface in some embodiments. For one or more such embodiments, direct transfers between network interfaces means that there are no intervening hardware switching or routing devices between network interfaces. The other network interface could be any other network interface for which the received data or information was destined, such as the other of the first network interface 223 and the second network interface 226, for example.

Figure 11:
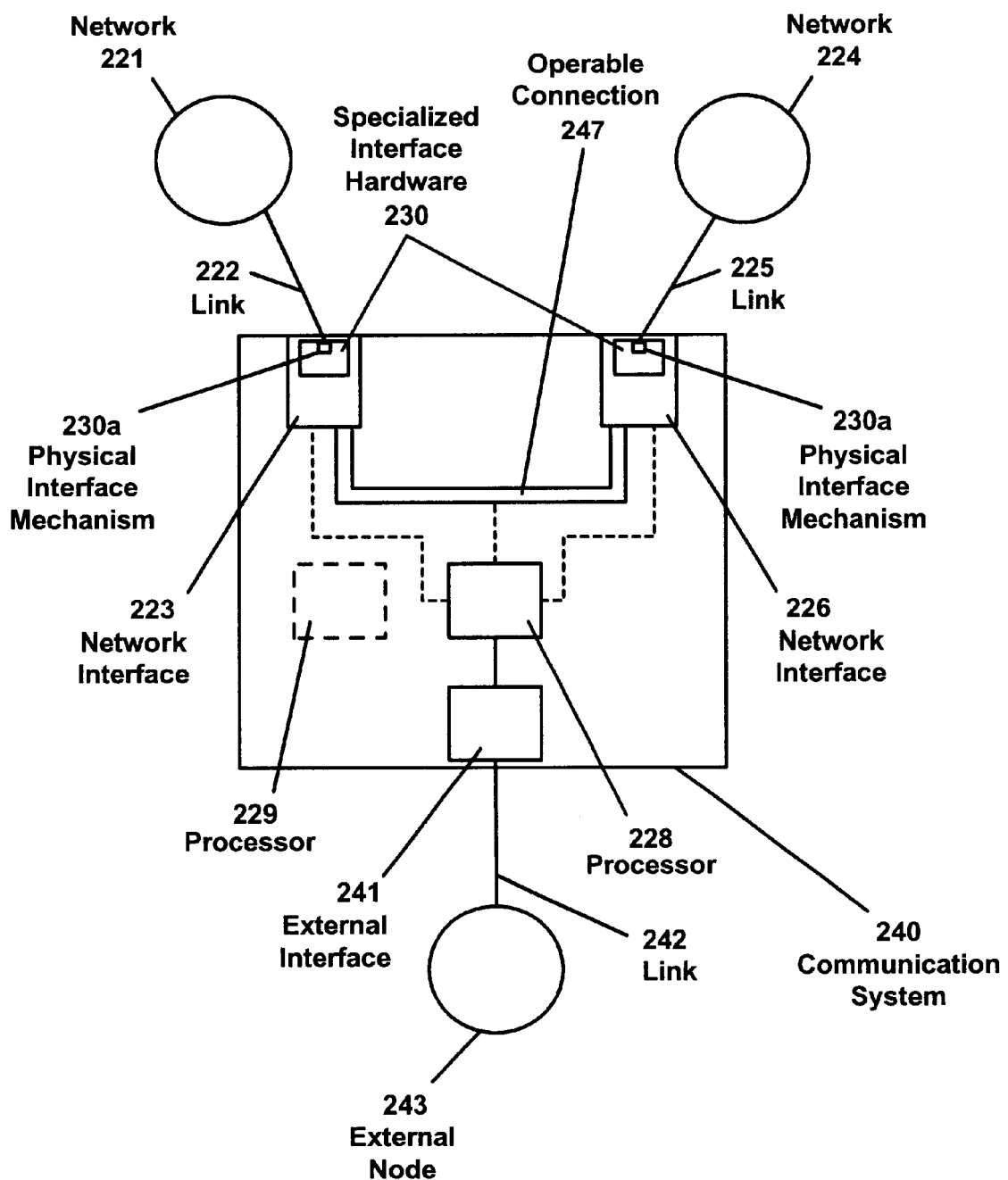
FIG. 11 is a block diagram illustrating a communication system for transparent exchanges between networks, according to some embodiments of the present invention.

Networks, such as the first network, second network, or any network shown herein attached to any communication system of the present invention, could each be any known network, such as one of the examples shown in FIG. 1, FIG. 2, FIG. 11, or other Figures. In addition, the first network and second network could be other networks not mentioned explicitly in FIG. 1, including yet to be developed networks. Any network can readily be accommodated and interfaced to the communication system by using a suitably designed network interface. Often, a variety of standardized parts and components are developed by the industry to consistently interface with particular networks. These parts and components can be used to implement a suitable network interface for the communication system. By using standard components to develop network interfaces, the open architecture aspects of the communication system are enhanced. There are no known limitations that would prevent the communication system from interfacing to a particular network through a network interface. In addition, there are no known limitations that could prevent the communication system from having other external interfaces for interfacing with remote devices. As noted, the first network and the second network may be the same type of network, such as two similar telephony networks or two similar IP networks. Of course, the first and second networks could be different in some respect; such as different in at least one network model layer, so the communication system could intelligently translate and transparently interconnect the somewhat different networks. For example, the communication system can provide an interface between different networks, such as between an IP network and a telephony network, or between two IP networks operating with different data link layers, or different physical layers, or both. For example, the communication system can interface an IP network and a telephony network despite their different network formats, such as shown in FIG. 4. Additionally, through the communication system an IP network implemented via Token Ring running on cabled media can be interfaced to an IP network implemented via Ethernet running wireless, for example.

Accordingly, through its network interfaces the communication system can support any network format associated with a particular network. For instance, the communication system can interface with a first network format associated with a first network and can interface with a second network format associated with a second network. As described, a given network format as used herein includes one or more of the network model layers associated with a particular network. In one embodiment, the first network format may comprise at least one of a network protocol and a network transport or media associated with the first network, and the second network format may comprise at least one of a network protocol and a network transport or media associated with the second network. As such, the communication system can interface networks having some difference in network protocol layers, network transport or media layers, or in one or more other layers. Accordingly, different networks or different network formats would have differences in at least one network model layer of interest. Similar networks or network formats would not have any differences, at least in the network model layer or layers of interest being compared. For example, differences in network model layers of two or more networks could be significant if network layers of interest that a processor accessed and compared had differences. Sometimes, differences in network layer models may not be important or significant. For example, a preset number of network layers from different networks may be encapsulated as payload and transmitted between different networks without requiring any comparisons or translations. For instance, layers 2 through 7 of TCP/IP networks operating on different physical layers or media, such as on fiber and wireless, could be encapsulated and transmitted as payload across TCP/IP networks having different physical layers or media. As another example, a network interface of the communication system could decode an incoming packet from an IP network; such as by removing the physical layer, the data link layer, or both. The remainder of the IP packet could be transmitted as payload in the third format to some other network interface. To summarize, all network layers of a network layer model define the type of network, while one or more network layers of interest to the communication system define the network format of the network. Optionally, the network format comprises at least the physical layer of the network or the data link layer of the network, or both the physical and data link layers of a network. All types of physical media/transports, data links/protocols, and other layers of diverse network layer models can be supported transparently by a communication system that includes suitable network interfaces and network format translation facilities.

Next, we describe some hardware parts and components that may be used to implement the subsystems comprising various communication systems according to the present invention, such as those found in communication systems 200 in FIG. 2, 220 in FIG. 5, 240 in FIG. 11, other disclosed embodiments, or the like. For example, the network interfaces and processor used in a communication system are constituent subsystems thereof. As a whole, the communication system may be viewed as integrated with respect to the number of network devices or communication systems it replaces. In addition, the communication system may be viewed as integrated since it transparently interconnects different networks. However, it is worth noting that the hardware parts and components used to implement the communication system may be embodied in logic devices and components having various different levels of integrated circuit (IC) integration. The parts and components used in a system or subsystem could be separate, discrete logic components, demonstrating a relatively low level of IC integration. In this case for example, one or more ICs may comprise a single subsystem of the communication system. For example, a network interface may comprise several integrated circuits and components, such as resistors, capacitors, and one or more network interface ICs. A communication system or its subsystems may be implemented with a higher level of IC integration, wherein one or more subsystems of the system may be combined in a single IC. For example, the processor and network interface logic could be combined into one relatively integrated IC. Still further, the communication system or its subsystems can be implemented with relatively high levels of IC integration. The entire communication system, or a significant portion of its subsystems, could be combined into a single IC given today's amazingly high levels of IC integration. In any case, the functions of the communication system and its constituent subsystems can be implemented using hardware parts and components embodying various different levels of IC integration.

Accordingly, we further describe the processing resources of the communication system, such as processor 228 as shown in FIG. 5. Processor 228 is required to translate or convert incoming data from the incoming network format to the third format, and optionally to inverse translate or convert data from the third format to the outgoing network format. In addition, a processor or programmable controller is also required to perform software switched transmission of incoming data directly from one network interface to another network interface. Further, a processor or programmable controller is needed to establish software switched logical connections between network interfaces. Of course, those skilled in the art will appreciate that the processor or other programmable controller can be provided with a suitable software program to execute, thereby enabling the processor to accomplish any required functions for the communication system. Further, each processor or programmable controller may have the necessary memory, disk, non-volatile storage, I/O, networking and communications peripherals, and other support necessary for it to accomplish the required functions. Processor 228 can be any commercially available processor, microprocessor, embedded controller, digital signal processor (DSP), some other programmable controller, or a hybrid processor containing DSP capability and more general purpose microprocessor or embedded controller capability.

A single processor, such as processor 228, may be sufficient to perform all the required format translations and software switched exchanges of data for the communication system. The communication system can operate with a single processor assuming it is provided with a suitable software program or programs, sufficiently rapid processing cycles, memory, peripherals, and the like, to support the functions to be provided. In some embodiments, more than one processor may be provided to support format translations and software switched transmissions. For example, a general purpose microprocessor or embedded controller may be programmed and assigned to perform software switched transmissions of data, while a DSP or DSP equipped hybrid processor can be programmed and assigned to perform format translations. As those skilled in the art will appreciate, if multiple processors are used, they may be statically or dynamically assigned to perform various functions required in the communication system. In FIG. 5, a second processor 229, shown as a dotted line box, could be an additional processor optionally providing multiprocessing capability as discussed. Processor 229 is defined the same as processor 228 above. While not shown for purposes of improving readability of the Figure, the second processor 229 could also be connected to at least one of the first network interface, the second network interface, and the shared non-switched system bus, similarly to the connections shown for processor 228. In addition, processor 229 and processor 228 could be operably connected to each other as required. Although not absolutely required, it may simplify the design and improve overall communication system performance to dedicate processors to the separate and distinct functions to be performed, either statically or dynamically.

Further, processor 228 may be operably connected to at least one of the first network interface 223, the second network interface 226, and the shared non-switched system bus 227. These options for interconnecting the processor 228 to the aforementioned are shown by the dotted connection lines in FIG. 5. Optionally, and as will be described, in some configurations the processor may be contained within a network interface and operably connected to that network interface or to one or more network interfaces. Further, the processor could be connected either directly or indirectly to at least one network interface. For instance, the processor could be connected to at least one network interface indirectly through the shared non-switched system bus, in order to perform the required format translations. The shared non-switched system bus 227 operably connects the first network interface 223 and the second network interface 226. Translations of incoming data received by one network interface, from an incoming network format to the third format, may be required in some embodiments for software switched transmission from one network interface through the communication system to another network interface. Translations from the third format to an outgoing network format may be required in some embodiments for transmission of data from the communication system to an outgoing network, through an outgoing network interface. The processor can also be connected to the shared non-switched system bus, the first network interface, or the second network interface as may be required to perform software switched transmission of data through the communication system between network interfaces. As used herein, a connection and an operable connection may include but are not limited to one or more of a direct electrical connection, a connection through some bus transceivers, a connection through some controlled bus interface logic, or the like, as may be required to properly interconnect hardware in the communication system.

Network interfaces, such as example network interfaces 201, 204, and 207 shown in FIG. 2 and network interfaces 223 and 226 shown in various Figures such as FIGS. 5, 6, 10, and 11 will be described further. The description of network interfaces applies equally to other external interfaces of the communication system unless differences are described. It should be noted that network interfaces can be connected together in some way to permit data to be exchanged therebetween. There are many ways to interconnect network interfaces. In some embodiments, network interfaces can be connected through a shared non-switched system bus. Thus, a network interface can have some bus interface capability, either stand-alone or through some optional external bus interface logic or support module. As such, the network interface can exchange data with the shared non-switched system bus and with other network interfaces. Further, for some embodiments a network interface is capable of exchanging data bi-directionally in an interleaved manner with another network interface to improve the performance of the communication system. From a hardware and software perspective, each network interface may comprise a single port customized for interfacing with a given network in a given network format. At a minimum, a network interface should support interfacing with at least part of the physical layer of a network layer model, such as part of layer 1 of the OSI network layer model. The network interface may also include support for additional network models layers, such as the data link or protocol layer. Further, the network interface may optionally support network layer 3 type functions or other higher level networking layer functions.

At least part of the networking support function required in a network interface may be provided by some specialized interface hardware for interfacing with an attached network. A network interface requires at a minimum some specialized interface hardware, such as a physical interface mechanism, for physically connecting to the attached network. Some specialized interface hardware in addition to the physical interface mechanism for supporting the attached network is optional and may be needed depending on the type of attached network. For example, a network interface might only comprise a physical interface mechanism, such as an RJ-45 connector for physically attaching to the network. No other specialized interface hardware may be required. A processor could accordingly connect directly to the network through the physical interface mechanism of the network interface and interact with the network without requiring additional intervening specialized interface hardware. In some cases, interfacing to an attached network may require a network interface having some additional specialized interface hardware or hardware components in addition to the physical interface mechanism. All or part of a network interface, including the specialized interface hardware, physical interface mechanism, and optional hardware components, may be operably connected to other network interfaces, one or more processors, or the shared non-switched system bus as may be required. The specialized interface hardware 230, as shown in FIG. 5 for example, is connected to a network such as 221 though a physical interface mechanism such as 230a which is connected to a link such as 222. The specialized interface hardware should support at least part of the physical layer as needed, such that data can be exchanged properly with the attached network. Specialized interface hardware 230 should include some physical interface mechanism 230a for interconnecting a network interface to a link, such as an RS-232 D-shell connector, a fiber optic connector, RJ-45 connector, Token Ring connector, coax connector, or the like. A physical interface mechanism could comprise an antenna, other mechanism for exchanging data with a wireless link, or the like. Further, the specialized interface hardware 230 might include some additional physical layer support functions. For example, the specialized interface hardware of a network interface connected to a telephony network could comprise hardware components to interface with the Tip and Ring wires of a POTS interface, such as resistors, capacitors, optoisolators, or the like. For instance, at least part of the specialized interface hardware could include a fiber optic transceiver used to interface the communication system to a fiber-based network. The specialized interface hardware could include a wireless transmitter, receiver, transceiver, or the like. Other components could be included in, or operably connected to, the network interface, the specialized interface hardware, or both.

As noted, the network interface may further contain support for data link or higher layer networking functions. Data link or protocol layer functions could be performed by a device such as state machine logic, an ASIC, integrated controller, some programmable interface controller or other programmable hardware device. The device or devices supporting data link layer functions could be within or connected to the network interface, and may be connected to the specialized interface hardware as needed. Support for data link layer functions could optionally be provided by the specialized interface hardware itself, such as by incorporating an Ethernet protocol module in the specialized interface hardware, for example. Higher level networking functions beyond data link layer support functions could be also provided by the specialized interface hardware, such as by including a more sophisticated Ethernet controller therein, for example. Those skilled in the art will appreciate that there are many permutations and combinations possible for implementing the functions required of a network interface, since the above discussion is intended to be illustrative and not all inclusive. Further, those skilled artisans will understand that many commercially available devices can function as network interfaces, specialized interface hardware, physical interface mechanisms, and the like, to support interfacing with many networks and network formats.

A network interface or other external interface of the communication system can be memory mapped and assigned a range of unique memory addresses associated with the interface. In some implementations, the specialized interface hardware or devices supporting the data link layer and higher layer networking functions may be memory mapped. Memory mapping interfaces can help support data exchanges performed through the communication system. Software switched transmission of data, other programmed transfers of data or parameters, and establishing software switched logical connections between network interfaces are among the communication system functions that can be supported by memory mapped network and external interfaces. Memory mapping interfaces may also allow software customization and control of network transmission/receive parameters, network interface controls or the like, for the network or external interface. Memory mapped access to network interfaces or other external interfaces also supports autonomous and efficient transfers of data between interfaces. Data transfers and exchanges setup by a processor between interfaces of a communication system can occur independently of further processor or user intervention.

Many relative configurations are possible that include the processor 228 and at least one network interface, for example like first network interface 223 or second network interface 226 as shown in FIG. 5. For example, processor 228 or some programmable interface controller could be external to but operably connected to a network interface. Alternatively, a processor or the like could be contained within a network interface. Various other configurations are possible given the descriptions of the processor and network interfaces provided herein. As noted, a network interface could at a minimum provide at least some physical layer support, although data link and higher level functions may be provided. Given the variable level of function that may be provided by a network interface, the functions that a processor can provide, and the particular implementation selected, a very high number of configurations are possible. FIG. 5 illustrates a first possible configuration in which a processor, such as processor 228 or processor 229, is separate from but may be operably connected to one or more network interfaces. Although not shown explicitly, first network interface 223 or second network interface 226 as shown in FIG. 5 and other Figures may also include optional bus interface logic 231 as shown in FIGS. 6(a) and 6(b) for interfacing with the shared non-switched system bus. FIG. 6(a) shows a second possible configuration of a network interface, such as in first network interface 223 shown as an example. In this configuration, processor 228 is integrated inside first network interface 223, and is connected to specialized interface hardware 230. Here in this configuration, the processor may also be connected directly to the shared non-switched system bus 227, or indirectly through optional bus interface logic 231.

A third possible configuration somewhat similar to the second example configuration is shown in FIG. 6(b). A network interface, such as first network interface 223 for example, may contain an integrated interface controller 232 integrated inside, instead of processor 228 as before. The integrated interface controller may contain state machines, suitably programmed RISC processors, controllers, or the like, specially adapted to interface with various network layer models of one or more networks. In addition, the integrated interface controller 232 may also include an integrated bus interface capability, such as provided by optional bus interface logic 231. Among the examples of these integrated interface controller devices are the Motorola QUICC family, LSI logic ATM processors, AMCC devices, or similar devices from a number of vendors designed to interface with a variety of different networks and network layer models. Further, the integrated interface controller 232 shown in this FIG. 6(b) may be operably connected to the specialized interface hardware 230, to the physical interface mechanism 230a, directly to the shared non-switched system bus 227, or indirectly to 227 through optional bus interface logic 231, similarly to the operable connections of processor 228 shown in FIG. 6(a). For this third possible configuration, processor 228 can be external to, but operably connected to, the first network interface 223 as per the first example configuration shown in FIG. 5.

However, a fourth alternate configuration may be created by making some relatively minor modifications to FIG. 6(b), such as by integrating processor 228 within first network interface 223 as shown in FIG. 6(b). This fourth configuration is also illustrated in the Figure by using dotted lines to show processor 228 and its operable connections. Several possible operable connections are shown between processor 228, integrated interface controller 232, specialized interface hardware 230, the shared non-switched system bus 227, and optional bus interface logic 231. These operable connections are described similarly to those shown in FIG. 6(a). Optionally, the processor could also be operably connected to specialized interface hardware 230 as in FIG. 6(a). Those skilled in the art will surely understand that other configurations are possible within the scope of the present invention. Also, the components or parts used for implementing each network interface and network interface configuration are preferably commercially available and previously developed for interfacing with the required layers of the networks to be interfaced. Packaging and IC integration level options provide an even richer set of possible configurations for implementing network interfaces. In any configuration, the network interface could be implemented and packaged in various ways. For example, a network interface could be implemented as part of a single printed circuit board incorporating an entire communication system. In another case, a network interface could be packaged within a separate printed circuit board or adapter for insertion into the communication system. Accordingly, the network interfaces of a communication system could be configured and reconfigured as required. As those of skill in the art will appreciate, there are numerous other examples of possible network interface configurations. The discussion above regarding network interfaces applies also to other external interfaces of the communication system.

Figure 10:
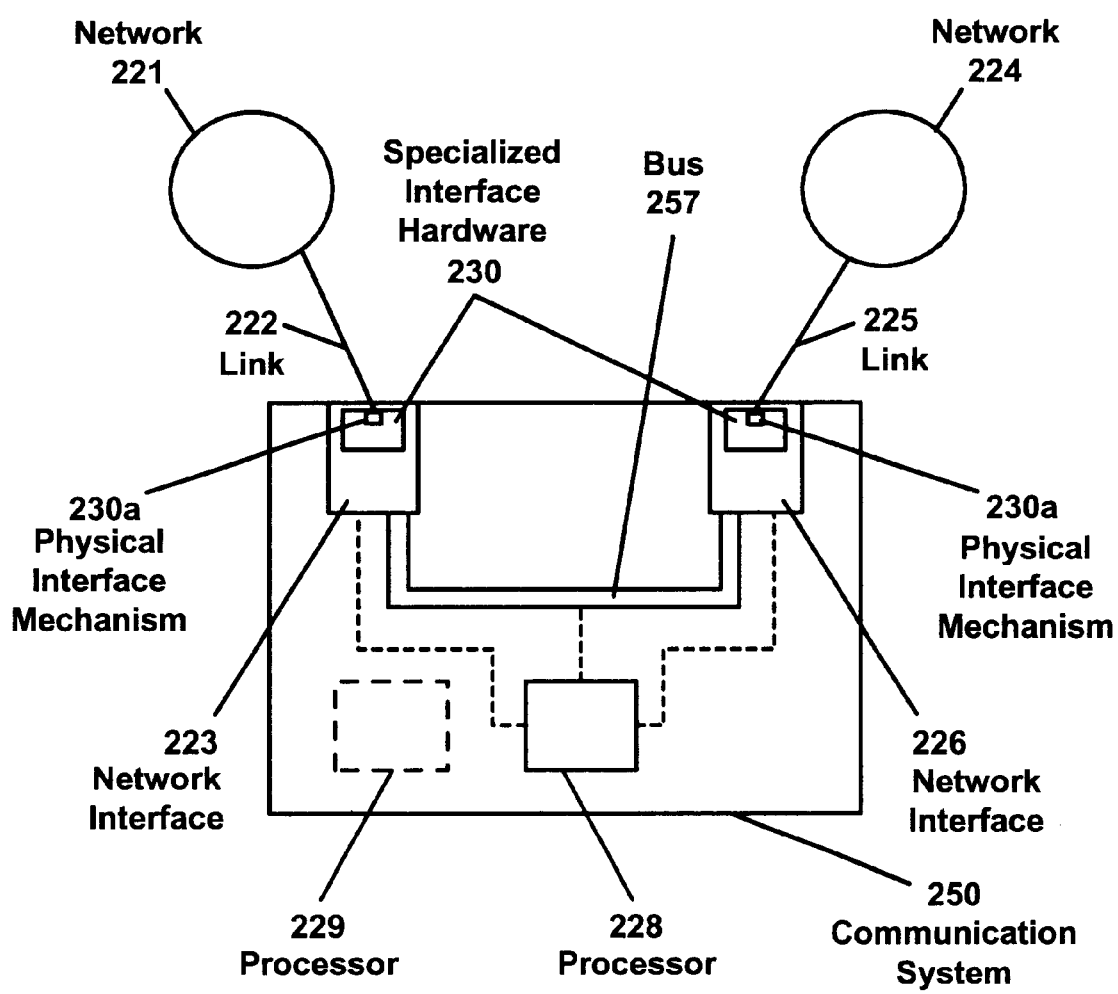
FIG. 10 is a diagram illustrating details regarding software switched transmission and software switched logical connections used for exchanging data, according to various embodiments of the present invention.

Next, the shared non-switched system bus 227 as shown in FIGS. 5, 6(a), and 6(b), the shared non-switched system bus 257 shown in FIG. 10, or the like, will be described. Alternatively, the shared non-switched system bus could be provided as a separate hardware path used to interconnect the required network interfaces, external interfaces, processors, and other hardware devices. The shared non-switched system bus could alternatively be some other electrical, optical, or wireless connection between interfaces of the communication system. Optionally, the shared non-switched system bus could be implemented outside the communication system through some cable or other interconnection mechanism between network interfaces and the like. Although the shared non-switched system bus could be a serial bus, for performance and cost reasons the shared non-switched system bus may be implemented as a parallel bus in some embodiments of the present invention. The shared non-switched system bus can be any common party-line bus suitable for connecting network interfaces, processors, subsystems, and other hardware devices as previously described together. Accordingly, the shared non-switched system bus connects portions of the communication system together without any type of intervening hardware switching device, such as a hardware switch, bridge, router, multiplexer, gateway, or the like. The communication system of the present invention can perform software controlled and software switched transmission of data, and does not require hardware switching devices for its shared non-switched system bus. Further, the communication system may use software commands to establish a software switched logical connection between network interfaces for transferring data between connected network interfaces, preferably but not necessarily through the shared non-switched system bus. To support the open architecture of the communication system, the shared non-switched system bus may be any non-switched industry standard bus. For example, the shared non-switched bus could be implemented as a PCI bus, Compact PCI bus, ISA bus, VME bus, VME64 bus, or the like. In some embodiments, the shared non-switched system bus could be an industry standard non-switched PCI or Compact PCI bus. Those skilled in the art are referred to industry standard PCI and Compact PCI specifications available from the PICMG (PCI Industrial Computers Manufacturing Group), such as PICMG 1.0, PICMG 2.0, and several others for specific electrical signal, pinouts, bus cycle, and timing details of these well known PCI busses.

The communication system may include the capability to transfer data bi-directionally, such as by providing full duplex data transfers between network interfaces, through the shared non-switched system bus or through some other connection between interfaces as described. In some embodiments as noted, the communication system can use the PCI bus to connect network interfaces and permit data exchanges therebetween. However, for industry standard PCI busses, transfers are inherently unidirectional, such as from Master to Slave or from Source to Target. However, some PCI bus interface chip vendors, such as AMCC for example, have sold commercially available PCI bus interface modules that can be programmed to permit interleaved bi-directional data transfers through the PCI bus. Alternatively, an ASIC could be custom designed, or an FPGA could be customized, to provide PCI bus interface modules which are also capable of interleaved bi-directional data transfers. For example, by using PCI bus interface modules such as these, Master to Source and Source to Master PCI bus transfers can be established across a standard PCI or Compact PCI bus for exchanging data bi-directionally between network interfaces. Alternatively, the shared non-switched system bus could also be any of a number of other suitable busses whether or not mentioned explicitly herein capable of supporting data transfers between interfaces and having relatively high bandwidth for data traffic of the communication system. In addition, the shared non-switched system bus could be integrated within the communication system, such as being an internal system bus.

Next, details associated with the third format used in some embodiments for transparent software switched transmission of data between network interfaces through the communication system will be discussed. Data in the third format may be exchanged transparently between network interfaces through the shared non-switched system bus or the like as described. Data or information received into one of the network interfaces, such as into one of the first network interface and the second network interface, can be translated from the network format as it was received from the one network into a third format. For example, data received into first network interface 223 or second network interface 226 in FIG. 5 can be translated from the respective incoming network format into the third format. Translations of data received into a receiving network interface can be performed by the processor, the receiving network interface, or both, depending on the particular implementation. The third format may be used as a common format for transparent software switched transmission directly within the communication system from the one network interface to the other network interface. Optionally, the third format may also be used as a common format for data transfers between network interfaces through a software switched logical connection established between network interfaces. Accordingly, the third format can serve as a common format used to exchange data transparently through the communication system between network interfaces. The third format is common no matter what types of networks are being interfaced by the communication system. Further, the third format is the same, regardless of network formats and the types of data/information involved. As such, the third format can be used to transparently support exchanges of data between network interfaces. Optionally, data in the third format transmitted to a network interface can be inversely translated from the transparent third format into the other network format, for transmission through the network interface to the other network. Note that the translation and inverse translation processes may or may not be symmetrical, depending on the networks involved. The processes are symmetrical only if the incoming network format and outgoing network format of data exchanged between network interfaces are the same. Otherwise, the inverse translation process will embody data in an outgoing network format different from the incoming network format. It is the asymmetrical nature of translations to and from the third format that enables the communication system to transparently reconcile different networks, different network formats, and different types of data and information.

Other aspects of translation, inverse translations, and how they are performed will be further explained. As noted, translation between a network format and the third format may require a network interface, a processor, or both, depending on the implementation and particular network involved. The same is true for inverse translation between the third format and a network format. For example, processor 228, first network interface 223 or second network interface 226, or some combination thereof as shown in FIG. 5 may be required. In one embodiment, the processor may be operably connected to both network interfaces, such as to both the first and second network interfaces, so that the processor can perform all required data translations. In this embodiment, the processor can translate data between the one network format as it was received and the third format, and the processor can also inverse translate data between the third format and the other network format for transmission to the other network. In another embodiment, the network interface receiving data can contain a processor therein so that the receiving network interface can translate data from the network format as received into the third format. Translating received data from an incoming network format to the third format requires both decoding and encapsulation processing. According to other embodiments that comprise multiple processors, one or more processors may be assigned either statically or dynamically to perform data translations or inverse translations. As described, the communication systems of the present invention include network interfaces for exchanging data and interfacing with given networks. These network interfaces can interface as required with a particular network format, including some or all of the network layers associated with a given network.

The design of the communication system, including the network interfaces and any required processing resources, can accommodate interfacing with various networks and network formats as noted in this disclosure. The programmable nature of the communication system is leveraged to flexibly interface with a number of networks, translate data from an incoming network format to a common transparent format, and inversely translate data in a common transparent format to an outgoing network format. Software programs and data structures may be loaded into some processing resource supporting a network interface, such as a processor, integrated interface controller, other programmable device, or the like as described. As such, support for incoming network formats, outgoing network formats, and the common transparent format can be readily provided through network interfaces by a processing resource. Further, the processing resource can also perform the necessary translations between network formats and the common transparent format. In some cases, software can be used to customize the data link layer, one or more higher network layers, or both, associated with a network format supported at a network interface. This customization can occur at discrete times on demand or dynamically to modify the function of a network interface, such as by modifying the software executed by a processing resource or the parameters processed by a processing resource. As such, network interfaces can be customized to support various networks and network formats. Several different networks and different network formats can be supported through a network interface, even when attached to a given, fixed, physical interface layer. For example, assume a network interface of the communication system is attached to a normal POTS telephone line. By customizing the software or parameters of a processing resource supporting a network interface, various network formats such as analog voice, V.90 modem, DSL, or others can be supported through a normal POTS telephone line. Further, various protocol stacks can be supported by customizing the software or parameters used by a processing resources supporting a network interface. For example, commercially available protocol stacks can be used to allow a processing resource to support that protocol at a given network interface.

Through a corresponding network interface, the communication systems of the present invention can decode or extract data received in a given network format from a given network. The decoding function can be applied to one or more of the network layers inherent in the incoming network format. In some cases, the decoding of incoming data may comprise simply extracting data from a given incoming network format. For example, decoding could comprise extracting analog voice data from the physical layer of an incoming call on a standard POTS telephone line. For some embodiments, data received in a network format may be decoded or extracted from its incoming physical layer and data link layer, so that decoded data can be represented by the contents of network layers 3 through 7 inclusive. For example, decoding or extracting incoming data from an Ethernet link running on copper wire could imply decoding physical layer 1 and data link layer 2. Thus, decoded data could comprise the Internet layer through the application layers of the TCP/IP network layer model shown in FIG. 4, for instance. Additionally, all network layers above the physical layer, such as layers 2 through 7 inclusive, could represent decoded data from an incoming network. For example, the protocol through application layers from a UDP/IP network could be extracted from the physical layer of an incoming fiber optic link. Depending on the network format and the number and type of network layers to decode, the decoding may be performed by the network interface alone, processor alone, or by both. For example, a network interface alone may be able to decode layers 1 and 2 of an Ethernet format. A processor, such as a DSP or the like, could be required to time sample a telephony network format, either alone or in conjunction with some network interface hardware. Once the desired number of layers of incoming data in a first network format are decoded, the communication system can further translate incoming data into a common, transparent format. Some amount of processing resources or "intelligence" is required to complete the translation of the decoded received data into the third format.

The third format is a transparent, common format that may be used to efficiently direct software switched data between network interfaces through the communication system. Accordingly, the third format can be an encapsulated format, such as an encapsulated hardware or software format, suitable for directing the data between interfaces, such as between network interfaces, external interfaces, or both. Optionally, the third format may include addressing information to identify only the destination or outgoing network interface. Alternatively, the third format may include addressing information to uniquely identify each network interface involved in exchanging data, whether uni-directionally or bi-directionally. As such, software executed by a processor of the communication system can determine the source network interface and destination network interface, and establish a software switched exchange of data between network interfaces using the third format. Exchanges of data in the third format can occur between network interfaces whether or not a software switched logical connection is established between network interfaces. An encapsulated format is well suited to serve as the third format. An encapsulated format, such as a hardware encapsulated format, can transparently carry decoded data between network interfaces, regardless of the incoming network format, outgoing network format, or type of data or information being exchanged. As such, decoded data could be encapsulated or packaged in a transparent third format to transport it through the communication system in a common manner. In one embodiment, data received into one network interface can be transmitted in the third format to another network interface through the shared non-switched system bus. For one embodiment, the third format may comprise an IP packet formatted from data received and decoded from any incoming network format, whether or not the incoming network format has an IP network format. For instance, voice data from an incoming POTS telephone network call could be decoded, digitized, and formatted as data in an IP packet representation format. For a related embodiment, the IP packet may be encapsulated in a hardware encapsulated format suitable for transmission through a shared non-switched system bus, such as a PCI bus, for example. As a further illustration, the POTS voice data payload in an IP packet format could be transmitted across the PCI bus in a hardware encapsulated format to another network interface.

FIG. 7 shows an example useful for explaining the decoding and encapsulation subprocesses used to translate between network formats and the third format. Incoming data must first be decoded from the incoming network format, and thereafter encapsulated into the third format to complete the translation process. In FIG. 7(a), an example of decoding incoming data is shown. Data 301 could be any form of data being received by a network interface in any incoming network format. For this example, the data 301 is shown in the OSI network model format. Data is decoded as shown by 305, which represents decoding as described. In this case, layers 3 through 7 are removed by decoding, and the decoded data 302 is represented as extracted from physical layer L1 and data link layer L2. L1 and L2 are collectively denoted as 303, and are removed by the network interface, processor, or both as explained above. FIG. 7(b) shows an example of encapsulating decoded data, in a continuation of the processing. Optionally, decoded data can be further processed or translated prior to encapsulation, such as to represent decoded data in a format used for transparent exchanges of data between network interfaces. For example, decoded data could be formatted into an IP packet format prior to being encapsulated in some encapsulated format used for transmission between network interfaces. The encapsulated format could be a hardware encapsulated format for transmitting the IP packet between network interfaces, such as through a PCI bus or some other hardware path between network interfaces. Decoded data 302 is encapsulated as shown by 310. The encapsulation packages decoded data 302 as payload in between encapsulation layer E1, denoted as 309, and encapsulation layer E2, denoted as 311. Encapsulation requires embedding payload data 302 into envelope 312; such as by adding the payload to the envelope in between the encapsulation layers, adding the encapsulation layers E1 and E2 to the payload, or both. Accordingly, data translated into the third format has been both decoded and encapsulated. Thus, data translated into the third format is represented as shown in envelope 312. The envelope 312 formed by E1 and E2 containing payload such as decoded data 302 is designed to efficiently transfer decoded data between network interfaces through the communication system. Note that envelope 312 is a common, transparent format, such as the third format, useful for transferring data between network interfaces independent of the origin or destination of the data. In addition, envelope 312 can be used to transfer data transparently between network interfaces regardless of what incoming network format and outgoing network format are used.

Since the payload can be extracted or decoded from incoming data in any network format and can be encapsulated within E1 and E2, the envelope representing the third format may represent a common transparent format used for transferring the payload within the communication system, such as between any two or more network interfaces. For example, envelope 312 may be used transfer decoded data payload created from data received in an incoming network format between the incoming network interface and another network interface. The envelope can be created from data received in any network format, such as the TCP/IP network layer model, the SS/7 or another telephony network layer model, or any other network layer model. Further, decoded data 302 could comprise payloads other than layers 3 through 7 of the OSI model shown as an example in the Figures. For example, decoded data 302 could represent an IP packet, some other packet, a cell, another industry standard format, a proprietary format, some data structure, or the like. In other words, decoded data could be represented in various formats, including an IP packet format. For instance, decoded data 302 could also represent part of one network layer, one network layer, or more than one layer of a given network layer model. Decoded data 302 could represent data or information extracted from any incoming network and any incoming network layer model and thereafter formatted into a particular decoded data format prior to encapsulation. For some embodiments, decoded data could comprise data received from any network in any network format arranged or packaged into an IP packet format. In other words, incoming data received in any incoming network format could be decoded or extracted and thereafter formatted as decoded data payload contained in an IP packet format for transmission between network interfaces. The IP packet could be encapsulated into an envelope, such as 312 for example, for transmitting the decoded data payload transparently between network interfaces. In one embodiment, data received from a POTS telephony network could be decoded or extracted, and formatted as payload into an IP packet format representing decoded data 302. The IP packet format could be encapsulated, such as in a hardware encapsulated format, for transmission between network interfaces. Further, the encapsulated format could be a hardware encapsulated format used to transmit decoded data in an IP packet format transparently between network interfaces through a PCI type bus. Data received in other incoming network formats, such as WAN, fiber, or many others, could also be represented as decoded data in an IP packet format for transmission between network interfaces. Alternatively, formats other than an IP packet could be used as the decoded data format being encapsulated to support transparent data exchanges between network interfaces. Further, any incoming data format may be supported by a compatible network interface, a processor, and a corresponding decoding process. The encapsulation process is typically similar regardless of the particular incoming network format encountered, since the encapsulation integrates a decoded data format into an appropriate encapsulated format used for transmission between network interfaces.

The envelope 312 may be used to transfer decoded data 302 between network interfaces 223 and 226. The envelope may be transferred between network interfaces through the shared non-switched system bus 227 in some embodiments, as shown in FIGS. 5, 6(*a*) and 6(*b*) or otherwise as described above. Thus, in some embodiments E1 and E2 may represent hardware encapsulation information. Accordingly, E1 and E2 may include addressing, transfer control, or other information needed to transfer the envelope, including its decoded data payload, through the shared non-switched system bus between network interfaces for some embodiments. Alternatively, E1 and E2 could include similar addressing, transfer control, or other information, such as software encapsulation information, needed to transfer the envelope between interfaces using a software encapsulated format. Envelope 312 may reside in memory mapped registers or memory locations before and after being transferred between network interfaces. In another related embodiment, the shared non-switched system bus may be a PCI bus, and the incoming network may be the Internet or an IP network. In this case, the third format may comprise an encapsulated PCI bus format for transmission of data between network interfaces. More specifically, the third format may also comprise an IP packet encapsulated in a PCI bus format for exchanging data between network interfaces across the PCI bus. The payload or decoded data may be represented as an encapsulated IP or Internet Protocol packet transferred over a PCI bus. As noted, the IP packet payload could comprise one or more layers of the IP network layer model, such as one or more of IP layers 2 through 7. The encapsulated PCI bus format may be further translated, actually inverse translated, into an outbound network format for transmission to another network.

An example of this embodiment, having an IP encapsulated in a PCI bus format for transmission between network interfaces, is illustrated in FIG. 8, including FIGS. (8*a*) and 8(*b*). In this case, network 221 can be the Internet or another IP network, while the shared non-switched system bus 227 may be a PCI type bus as per FIG. 8(*b*). Data received by the first network interface 223 from network 221 may be decoded by the network interface alone, assuming for example that the network interface can decode layers 1 and 2 of the TCP/IP stack or can extract data from a TCP/IP stack for this example. Processor 228 could then encapsulate the decoded data, including at a minimum data or at least one network layer, into a hardware encapsulated third format, such as shown in FIG. 8(*a*). As before, we note that the decoded data, such as an IP packet or the like for example, could comprise one or more of layers 2 through 7, depending on the given implementation. Alternatively, the decoded data could represent data from a non-IP incoming network format repackaged as payload in an IP packet format. The envelope 340 represents an encapsulated third format that includes an IP packet inside the decoded data payload area 343. E1' 341 and E2' 342 are example encapsulation layers that include all addressing and other parameters necessary to transfer the envelope in the third format across the PCI bus. In essence, the IP packet is hardware encapsulated in a PCI bus format suitable for transmission between network interfaces. As shown in FIG. 8(*b*), envelope 340 representing data in the third format can be transferred across PCI bus 227 between the receiving network interface 223 and the other network interface 226. In practice, the envelope would reside in a first memory space, such as some memory mapped registers or memory locations associated with the first interface 223. For example, the envelope 340 for a PCI embodiment could be represented in some memory mapped block format for PCI bus transfers that may include transfer control, addressing information, and data payload portions for transmitting data through the PCI bus between interfaces.

PCI bus transfers could then be enabled under software control to permit the transfer of the envelope to a second memory space, such as to some memory mapped registers or memory locations associated with an outgoing network interface, such as the second network interface 226. Thereafter, inverse translation from the third format into a second network format, such as by decapsulating the envelope and then encoding the data payload into a second network format, could optionally be performed. Inverse translation is required to prepare payload in the encapsulated third format for transmission to some outbound network. The data payload, in effect an IP packet encoded with an outgoing network format, could then be transmitted to a second network 224 in the second network format through the second network interface 226. In the above embodiment, which in effect is "IP over PCI", the third format may comprise an IP packet encapsulated in a PCI memory mapped control block structure which is transferred over the PCI bus using PCI bus cycles. IP over PCI may be accomplished in an efficient manner using a standard PCI bus and off the shelf hardware through the communication system. In another related embodiment, the second network 224 can be a telephony network while the first network 221 could be the Internet or an IP network, such that IP telephony or VoIP (Voice over IP) can be provided in addition to IP over PCI by the communication system of the present invention.

FIG. 9, including FIGS. 9(*a*) and 9(*b*), can be used to further describe the inverse translation process, such as translating data from the third format into an outgoing network format. The inverse translation process requires applying the subprocesses of decapsulation and encoding, in that order, to data in the third format. As shown in FIG. 9(*a*), envelope 312 carries payload data 302 in the encapsulated third format, more specifically payload data 302 is encapsulated between encapsulation layers E1 309 and E2 311. The payload data 302 as indicated spans layers L3 through L7 for this example, but the data could have been received in any incoming network format and encapsulated. FIG. 9(*a*) shows an example of the decapsulation process, the first part of the inverse translation process. Envelope 312 is decapsulated by 315 as shown, which represents the decapsulation process. Decapsulation requires recovering payload data 302 from envelope 312, such as by extracting the payload or data from between the encapsulation layers E1 and E2 of the envelope, removing the encapsulation layers E1 and E2 from the payload, or both. The decapsulation process is the same for a given implementation of a third format since it processes an encapsulated envelope in the third format as the input. In any event, payload data 302 is recovered after decapsulation processing, as shown. E1 and E2 may be processed further or discarded as desired.

FIG. 9(*b*) shows an example of the encoding process, the second and last part of the inverse translation process. Encoding represents converting or translating the recovered payload data into an outgoing network format suitable for transmission to a network. The encoding process can vary since it depends on the characteristics, such as the network format, of the outgoing network to which encoded data will be transmitted. Payload data 302 is encoded by 320 as shown, which represents the encoding process. For this example, encoding for the payload data requires adding a suitable layer 2 and layer 1 as shown by 304, representing the data link layer and physical media layer respectively, to the payload data 302 as represented by layers L3 through L7. Of course, the encoding process can add one or more layers from a given network format to the payload data to prepare it for transmission to the outgoing network. At the conclusion of the inverse translation process, such as after decapsulation and encoding, the payload data is embodied in a network layer model stack, such as 321, which can be transmitted through a network interface to an outgoing network in a compatible network format. Similarly to encapsulation, the decapsulation process requires some processing resources, such as processor 228, one or more other processors described herein, or the like. The encoding process, analogously to the decoding process, may be performed solely by the outbound network interface, the processor, or both, depending on the outgoing network format and the respective implementations of the network interface. and processor. In addition, both translations and inverse translations may be performed solely by the associated network interface, the processor, or both. Those skilled in the art should appreciate that the translation and inverse translation processes, including their component subprocesses, may have to reconcile differences in network formats, such as those indicated by the differences in network layer models shown in FIG. 4. It is by reconciling differences in network formats that the communication system of the present invention can support transparent exchanges of data and information between networks and network formats.

An overview of how translating data into a third format supports transparent exchanges of data is now provided. By using a common third format, such as an encapsulated format, it is possible to software switch and direct incoming data transparently between network interfaces, without regard to the incoming network format and the outgoing network format. By using the common third format, data can be transparently and generically exchanged between network interfaces of the communication system, regardless of the network formats of networks attached to those network interfaces. Incoming data in an incoming network format can be decoded and encapsulated into a common third format. The incoming data can be decoded by extracting it from one or more network layers of a network layer model as required to create the payload or decoded data. The payload or decoded data can then be encapsulated as required to embody it in the desired common third format. Once data in the common third format has been effectively transmitted to an outbound network interface, the translation can be inverted or reversed. Thereafter, the communication system can decapsulate and encode data from the common third format into the network format of an outgoing network. Analogously, the encoding can be applied to one or more network layers of a network layer model as required for compatibility with the outbound network format. As such, the data can thereafter be transmitted out of an outbound network interface to the corresponding outbound network. It worth noting that the translations and processing of data described above function equally well whether the incoming network format and outgoing network formats are the same or different. This is the case since incoming data and network formats are processed in a common, transparent manner using translation into the common third format for transporting data between network interfaces. In some cases, the translation and inverse translation processing must reconcile differences in network layer models, as indicated by FIG. 4. The communication systems provided by the present invention can therefore exchange data and information transparently between diverse networks having different network formats.

Next we describe the software switched and software controlled features of the system, which are significant aspects in some embodiments of the communication systems provided by the present invention. Software switching of data, software switched transmissions of data, and software switched logical connections established between network interfaces will be discussed. FIG. 10, representing a communication system according to the present invention, will be used for these software switching discussions. As noted, the transfer of data or information between network interfaces, whether in the third format or not, is accomplished through software executing in a processor, such as processor 228 or the like as noted. FIG. 10, showing a representative embodiment of a communication system 250 according to the present invention, may be used to illustrate software switched transmission and software switched logical connections. By determining which interfaces should be allowed to exchange data, the software could setup the route used for sending and receiving data between network interfaces, thus performing a software switching function. In other words, software can switch data by determining what network interfaces are to exchange data, can enable those network interfaces to exchange data, and can optionally determine whether the data exchange will be uni-directional or bi-directional between network interfaces. For example, in FIG. 10 software may determine that network interface 223 should transfer data to network interface 226 and can enable the data transfer between those network interfaces. As such, software switching and software enabled transfers of data between network interfaces could occur without logically connecting or associating network interfaces. Software switching does not preclude establishing a logical connection or association between network interfaces for transferring data between network interfaces. For example, software may optionally determine that network interfaces 223 and 226 should be logically connected through software intervention so they can exchange data with each other. The communication system relies upon software switched transmission to exchange data between network interfaces, optionally but not necessarily through a software switched logical connection established between transferring network interfaces. In other words, data can be transferred by software switched transmission between network interfaces with or without establishing a logical connection between network interfaces.

Communication systems according to the present invention can perform their switching using software, not hardware. As described, the shared non-switched system bus used in the communication system is by definition a common, party line bus without any intervening hardware switching devices disposed between network interfaces, processors, or the like. As shown in FIG. 10 for example, shared non-switched system bus 257 connects network interfaces 223 and 226 directly without any intervening hardware switching devices. In a like manner, the switching of data between network interfaces is performed under software control, without reliance upon hardware switching devices as duly noted. A processor such as 228 or the like executing a software program can receive information indicating which network interfaces are to exchange data. The processor can establish a data transfer between those network interfaces, in essence by switching the data using software, and support a software switched transmission of data between those network interfaces. In addition, a processor executing a software program, such as processor 228 shown in FIG. 10 or the like, can receive network interface connection information, indicating which two or more network interfaces are to be logically associated or connected for transferring data between the specified network interfaces. For example, network interface connection information or a software command could at least contain parameters indicating which network interfaces are to be logically connected for exchanging data. The processor can use the network interface connection information to establish a software switched logical connection for exchanging data between the specified network interfaces. By logically associating or connecting the specified network interfaces, software switched transmission of data can occur once a software switched logical connection is established between network interfaces. For example, network interface connection information may direct that network interfaces, such as 223 and 226 shown in FIG. 10, should be logically associated and logically connected together for purposes of transferring data therebetween. As such, software determines that data will be transferred between network interfaces 223 and 226, in essence switching and enabling transfers of data between those network interfaces and their respective connected networks. The data transfer may be conducted through the established software switched logical connection that connects network interfaces 223 and 226.

Software switched transmission of data can be established by the processor, the receiving network interface, the outgoing network interface, or some combination thereof. Recall that in some embodiments, network interfaces may include a processor or programmable controller therein. A software switched logical connection can be established automatically under software control, without requiring intervention from a user of the communication system, between network interfaces. The software switched logical connection logically relates and connects network interfaces to each other such that data transfers are enabled therebetween. In essence, this software may use network interface connection information to issue commands to the respective network interface or interfaces so as to "introduce" them to each other or to make each network interface aware of other network interfaces with which data may be exchanged. For example, the processor executing software could issue commands to address registers within the network interfaces shown in FIG. 10 so that the interfaces can transfer data to each other using memory mapped transfers. For instance, the processor executing software could setup control blocks in memory to enable transfers or exchanges of data between two or more network interfaces. As a further example, the processor executing software could issue commands to setup memory mapped transfers, such as DMA transfers, between mutually memory mapped network interfaces. Once introduced, network interfaces can transfer or exchange data directly between network interfaces autonomously and without requiring any additional processor or software intervention. In other words, once data transfers between network interfaces have been setup; the network interfaces can initiate the data transfer therebetween autonomously without needing any additional processing or software intervention.

Data or information may be transferred directly between network interfaces through the software switched logical connection established between transferring network interfaces. Software switched transmission, as used herein, includes using software executing in a processor to determine what network interfaces should be enabled to exchange data with one another, and issuing any required commands or performing any actions required to establish data transfers or data exchanges between the network interfaces. As explained, software switched transmission of data could be provided with or without establishing a software switched logical connection between network interfaces. For example, transfers between network interfaces such as those shown in FIG. 10 could be setup and executed without logically connecting or associating network interfaces together under software control. However, these data transfers or exchanges could occur through a software switched logical connection established between those network interfaces. Transferring data through a software switched logical connection can simplify the software design significantly. Since a network interface can be addressed by software as a "port", software commands or the like can be created to simply connect ports together. It is possible that the software commands used to connect ports together can logically connect two or more ports together in a ring or daisy chained configuration. For example, a first network interface and second network interface can be connected, while the second network interface and a third interface can be connected, and while the third network interface and the first network interface can be connected. This optional ring interconnection of network interfaces may be used when exchanging video or image information, as with a videoconference application of the communication system. Of course, network interfaces can also be connected in a star configuration or other configurations as required.

There are at least three mechanisms through which software switched transmission or software switched logical connections can be established under software control. First, a user could interact with a GUI interface on a Personal Computer running a software application and connected to some interface of a communication system. This approach may be acceptable for configuring parameters initially, but has performance and inefficiency problems if the ongoing data transfer operations of the system are managed this way. In a second option, automatic software modules can operate real-time in order to effect software switched transmissions of data, to establish and de-establish logical connections of network interfaces, or both. Third, status events or other events occurring at one or more network interfaces can be monitored by software, such that software switched transmissions or software switched logical connections between network interfaces can be setup under event driven software control. Those skilled in the art may realize that many other mechanisms not disclosed here may be possible as well.

The software switched logical connection can comprise a hardware path established between network interfaces, at least temporarily, under software control. For example, a software switched logical connection could be represented by programmed memory accesses or DMA accesses established across the shared non-switched system bus to transfer data between network interfaces 223 and 226 in FIG. 10. Further, the software switched logical connection may comprise the processor establishing a logical hardware connection between network interfaces for transmitting data in the third format directly between network interfaces. The logical hardware connection may comprise a memory mapped connection between network interfaces, a memory mapped connection between network interfaces established through the shared non-switched system bus, or a DMA memory mapped connection between network interfaces established through the shared non-switched system bus. The logical hardware connection may also provide either bi-directional or uni-directional data transfers between network interfaces. For some embodiments in which the shared non-switched system bus is a PCI type bus, software switched transmission of data in the third format may comprise establishing a software switched logical hardware connection, across the PCI bus between network interfaces, for exchanging data in the third format therebetween. In this embodiment, the software switched logical hardware connection may comprise establishing a PCI memory mapped connection between network interfaces. For example, shared non-switched bus 257 in FIG. 10 could be a PCI bus, and a memory mapped connection between network interfaces 223 and 226 could represent the logical connection for transferring data therebetween. Two or more network interfaces can optionally be logically connected or associated together under software control so that they exchange data between the logically connected network interfaces. PCI memory mapped logical connections may include master to target PCI bus memory access cycles, bi-directional PCI bus memory access cycles, master to target PCI bus DMA access cycles, and bi-directional PCI bus DMA access cycles for transmitting data directly between network interfaces through the PCI bus.

For this PCI embodiment, software switched transmission may also comprise transmitting data directly between network interfaces through the PCI bus, independently of the processor, after the software switched logical connection is established between network interfaces. The network interfaces can use the logical connection or hardware path once established to transfer data between network interfaces. After the logical connection has been established under software control, data transfers may be started by and carried out autonomously between network interfaces, without further software or processor intervention. For example, DMA transfers between network interfaces 223 and 226 in FIG. 10 can occur automatically sometime after software has established a logical connection between interfaces by enabling DMA transfers between those two interfaces. Data transfers through a logical connection can continue uninterrupted—until and unless there is no more data to transfer or the logical connection between network interfaces is disabled or de-established under software control. A logical connection can be de-established by commands or the like issued to network interfaces under software control, for example. The commands could break the logical connection between network interfaces, could prevent any further autonomous data transfers between network interfaces, or both. A processor executing software used to perform software switched transmission of data may also de-establish the data transmission or logical hardware connection established between network interfaces.

Software executing in a processor may determine which network interfaces should be enabled to exchange data therebetween. Once the processor executing software has determined which network interfaces are to exchange data, such as between network interfaces 223 and 226 in FIG. 10 for example, software issues commands to those network interfaces. Data transfers can be established between any two or more network interfaces, including external interfaces, as may be required. Each network interface can transfer data to and receive data from, one or more other network interfaces in an interleaved bi-directional manner. While bi-directional data transfers can be established, data transfers in one direction between network interfaces are also supported as a subset of the bi-directional transfers that can be enabled. Since data transfers may optionally be performed through the shared non-switched system bus, some interleaved data transfers may at times be queued temporarily waiting to access the shared non-switched system bus. Also, software switched transmission of data may further comprise transmitting data directly through the logical hardware connection, independently of the processor, after the processor establishes the logical hardware connection between network interfaces.

Another preferred embodiment of a communication system according to the present invention is illustrated in FIG. 11. In particular, the Figure shows a communication system 240 for exchanging data and information between networks. This communication system embodiment is an integrated system supporting externally controlled exchanges of data and information between networks, by using received network interface connection information. Other related communication system embodiments can optionally also support transparent exchanges of data between network interfaces, such as by using the common third format and variants thereof as described previously. The communication system comprises a first network interface 223, a second network interface 226, and a processor 228. Those skilled in the art will recognize that the communication system may comprise more than two network interfaces, as well as other types of external interfaces. The first network interface 223 is connected to a first network 221 through link 222 as shown, and exchanges data in a first network format with the first network. Similarly, the second network interface 226 is connected to a second network 224 through link 225 as shown, and exchanges data in a second network format with the second network. In an embodiment, the first network format may comprise at least one of a network protocol and a network transport or media associated with the first network, while the second network format may comprise at least one of a network protocol and a network transport or media associated with the second network. The first network interface 223 and the second network interface 226 are operably connected. The network interfaces may be connected as shown through operable connection 247, for example. Optionally, the network interfaces may be connected through a shared non-switched system bus in some embodiments. Also, other connections described previously between network interfaces may be used. The processor 228 further comprises an external interface 241 that can be used to communicate through link 242 with an external node 243. As such, the processor 228 can exchange information and data with external node 243, and can transmit and receive data and information through link 242. Processor 228 can also execute a suitable software program therein to support the operation of this embodiment, such as for interfacing with the external interface, the first network interface, and the second network interface, for example. In addition, the processor 228 can be operably connected to at least one of the first network interface 223, the second network interface 226, and the external interface 241 such that it can interface with, and can support exchanges of data between, each operably connected interface. The communication system 200 of FIG. 2 and also communication system 220 of FIG. 5 can optionally support externally controlled exchanges of data and information between networks by using network interface connection information received from a source external to the communication system.

Processor 228 can therefore receive network interface connection information, such as information describing which two or more network interfaces are to be logically connected under software control, from at least one of the interfaces operably connected to the processor. The processor executing a software program can use the network interface connection information received to optionally establish a software switched logical connection between the first network interface and the second network interface. The processor executing a software program can establish the logical connection automatically and without any real-time intervention from a user of the communication system. In any case, the network interface connection information could indicate to the processor that it should logically interconnect at least the first network interface and the second network interface. Of course, more than two network interfaces or different types of interfaces of the communication system could be logically interconnected. The logical connection is software switched since the processor executing a software program determines which network interfaces are to be logically connected together, and establishes the logical connection therebetween. The processor may issue commands to at least one of the network interfaces involved in the exchange of data in order to establish the software switched logical connection, as discussed. Optionally, the software switched logical connection may comprise a hardware connection established under software control by the processor. The hardware connection is established by the processor between the first and second network interfaces for transmitting data between network interfaces. For example, assuming that the network interfaces within the communication are memory mapped, the software switched logical connection could comprise creating a memory mapped connection between network interfaces. Accordingly, the hardware logical connection could be a uni-directional logical connection or bi-directional logical connection established between memory mapped network interfaces for exchanging data. Regardless of the specific implementation used, the establishment of the logical connection supports transfers and exchanges of data between interfaces through the communication system. As duly noted, the software switched logical connection between network interfaces can also be de-established by the processor under software control.

The present embodiment relating to externally controlled exchanges of data and information shares some features in common with other disclosed embodiments, such as the embodiment shown in FIG. 2 or FIG. 5. Unless otherwise defined differently in describing the present embodiment, the terms and features herein, including various alternative embodiments and implementation noted, are to be as defined as per descriptions provided with other disclosed embodiments. Terms not defined in the disclosure of the present embodiment should be construed as they would be by those skilled in the art. For example, the processor and network interfaces, including various alternative configurations, should be construed herein as previously described. For instance, with the exception of the direct nature of the transmission between network interfaces, the prior discussions of software switched transmission and software switched logical connections are applicable for this embodiment. This embodiment does contain some differences as compared to prior embodiments, such as not necessarily requiring the use of the third format or encapsulation. Also, the present embodiment includes an external interface. For instance, the external interface of this embodiment, such as external interface 241 of FIG. 11, should be construed analogously to the previously described network interfaces, except that the external interface 241 may optionally attach to some communication link, such as a local or remote RS-232 interface for instance, that may or may not be connected to a network. For example, the external interface could comprise an RS-232 interface or other connection established directly with a Personal Computer or another communication system. Alternatively, the external interface could comprise another network interface that can be used similarly to the other network interfaces for exchanging data with networks. Those skilled in the art will appreciate that there are many possible options for the external interface. Also, the network interface connection information could be received by one or more interfaces. For example, an external interface as described, a network interface, or both could be used to receive network interface connection information from a source external to the communication system. Thus, the external interface of the processor could be the first network interface, the second network interface, or an interface independent of the first and second network interfaces. This architecture allowing network interface connection information to be received by any interface of a communication system provides flexibility in how software switching of data within the communication system can be controlled externally.

Data or information may be received into one network interface, such as into one of the first network interface 223 and the second network interface 226. The other network interface could be the other of the first network interface 223 and the second network interface 226, such as the network interface for which the received data or information was destined. The received data or information can be transmitted directly between the one network interface and the other network interface through the software switched logical connection between network interfaces. For this embodiment shown in FIG. 11, direct transfers between network interfaces could optionally include intervening hardware devices, such as switches, routers, or the like, between network interfaces. The logical connection or path between network interfaces could be established by processor interaction with the intervening hardware devices. However, these direct transfers could be optionally provided herein such that there are no intervening hardware switching or routing devices between network interfaces. In any case, after the processor executing software has established the logical connection, the transmission of data through the software switched logical connection can occur without further processor intervention. The processor executing a suitable software program, in conjunction with other facilities of the communication system such as network interfaces, an external interface, and the like, can help provide externally controlled switching or directing of data between networks through network interfaces of the communication system.

The embodiment shown in FIG. 11 does not require that incoming data received be translated from an incoming network format into a third format. Optionally, in a related embodiment the data or information received by a network interface could be translated from the network format as received from the one network into a third format, as previously discussed. The third format can be used to support software switched transmission and transparent exchanges of received data or information from the one network interface directly to the other network interface. For one related embodiment, data received by one network interface may optionally be converted or translated from the one network format as received into a hardware encapsulated format for transmission to the other network interface. In this case, the processor, the one network interface receiving data, or both, could perform the conversion or translation required. As previously discussed, data in the hardware encapsulated format received by one network interface may optionally be translated into another network format for transmission through the another network interface to another network. The embodiment of FIG. 11 can provide externally controlled exchanges of data and information between networks. In combination with other disclosed features and embodiments of the present invention, this embodiment can also provide intelligent and transparent exchanges between networks while reconciling different forms of data, different types of information, and different network formats.

A related embodiment of the communication system further comprises a second processor therein, such as second processor 229 as shown in FIG. 11. The second processor is shown by a dotted line box to show that it is optional. The second processor 229 may be operably connected to processor 228, and may additionally be operably connected similarly to processor 228, as shown by the solid and dotted line connections between processor 228 and other parts of the communication system. Thus, the second processor 229 may be operably connected to at least one of the first network interface 223, the second network interface 226, the external interface 241, and the processor 228. For this embodiment, one of the processor and the second processor may perform conversions, translations, or other functions of the communication system, while the other of the processor and the second processor may establish software switched logical connections between network interfaces for exchanging data. As before, the processors can share supporting these functions on a static or dynamic basis as desired. Translated data in the hardware encapsulated format may be transmitted directly from the one network interface to the other network interface, through the software switched logical connection established between network interfaces.

The operable connection between first network interface 223 and second network interface 226, such as example operable connection 247, may be implemented in different ways in different embodiments. This embodiment does not necessarily require a shared non-switched bus, PCI bus, or another bus as noted. For example, the operable connection for this embodiment could be implemented through a cable or fiber providing some electrical or optical connection respectively between network interfaces for exchanging data therebetween, as described before. In one related embodiment, the operable connection 247 may optionally comprise a shared non-switched system bus, such shared non-switched system bus 227 described in other embodiments, for example as shown in FIG. 5. Thus, at least the first network interface 223 and the second network interface 226 may be operably connected through the shared non-switched system bus. Further, the software switched logical connection between the first and second network interfaces may be established through the shared non-switched system bus. One embodiment includes a PCI bus serving as a shared non-switched bus, such that data received by one network interface in the one network format may optionally be translated into a hardware encapsulated format for transmission from the one network interface to the other interface across the PCI bus. For a PCI embodiment, the software switched logical connection established between network interfaces across the PCI bus could comprise a memory mapped PCI bus transfer such as a uni-directional PCI bus transfer, a bi-directional PCI bus transfer, a PCI memory access cycle, a PCI DMA access, or combinations thereof. In a related embodiment, at least one of the networks connected to the network interfaces comprises an IP network, such that the hardware encapsulated format comprises an IP packet encapsulated in a PCI bus format for transmission between network interfaces. As discussed previously in other embodiments, this would represent IP over PCI, as implemented by the communication system of the present invention.

Next, we describe external node 243, which is connected to external interface 241 through link 242 as shown in FIG. 11. The external node can be implemented in a variety of ways. For example, the external node could be a Personal Computer, communication system, networking device, or the like. Preferably, the external node contains a processor therein executing a software program. One related embodiment includes an external processor, such as an external processor contained in an external node like 243, operably connected to at least one of the first network interface, the second network interface, and the external interface. The external processor of the external node executes a software program therein and has sufficient memory, I/O, and peripherals for interacting with a communication system, such as 220 or 240 for example.

The software program executed by the external processor of the external node could include a software module or software application for interacting with the communication system, such as for determining the number of networks and devices attached to the various interfaces of a communication system. For this software program, interfaces could include network interfaces, external interfaces, or both of a communication system. In addition, the external processor could optionally determine what bandwidth, what type of network, what network format, what format of data, and what type of information are associated with each interface of the communication system. Further, the software program could be informed of some event or activity occurring at some part of the communication system, such as at a network interface or external interface of the communication system. For example, an event or activity could represent some communication between the communication system and an attached network or device, or could represent detecting some link or network going online or offline. Further, an event or activity of the communication system could represent some status or error information from an attached network or device, could represent some other condition associated with an attached network or device, or the like. The software program can analyze the event or activity occurring at the communication system, and may or may not transmit a control message or the like to the communication system which could cause the communication system to take some action in response. For instance, the software program could cause the communication system to initiate another event or activity for responding to an event or activity occurring at an interface. Optionally, the software program could initiate some event or activity at an interface of the communication system, whether or not in response to another event or activity occurring at the communication system. The software program executed by the external processor could also determine whether to connect interfaces together, which two or more interfaces to connect together, and how to connect interfaces together in a communication system connected either directly or indirectly to the external processor. Optionally, the external processor executing the software program may transmit network interface connection information to a processor in a communication system of the present invention connected thereto.

As such, the processor in the communication system could use the connection information to establish a software switched transmission or software switched logical connection between the specified network interfaces. The software program executing in the processor of the communication system could be able to interpret network interface connection and commands received from the external processor. As such, the processor in the communication system can act as an agent or command interpreter for the external processor. In addition, software executing in the processor of the communication system could have awareness of the external processor and of the status of each network interface and external interface of the communication system. Thus, the processor of the communication system can relay network interface status, external interface status, and other status of the communication system as may be required by the software program executed by the external processor. With real-time status obtained from the communication system, the software program executing in the external processor can make informed decisions regarding whether, how, and which network interfaces of the communication system could be logically connected for exchanging data. The software program can intelligently decide how to software switch data between interfaces, whether and which interfaces to logically connect, or both, according to some other applications or services that may be provided by the software program executing in the external processor.

As mentioned, the software program executed by the external processor of the external node could include a software application that can determine how to manage and request the interconnection of interfaces within a communication system. For example, an incoming telephone call directed into one network interface of the communication system could cause the software program to order the logical connection of the one network interface to another network interface connected to the Internet or an IP network. Thus, an incoming POTS telephone call could be directed to the Internet or another IP network in an implementation of VoIP (Voice over IP), without requiring any specialized IP telephones or the like. In another example, the software program could order the connection of various interfaces connected to telephony networks to create a teleconference. Further, the software program could issue commands to interconnect various Personal Computers or the like for establishing real-time videoconferences through the communication system. These are but a few examples of the many functions and services that can be provided by a communication system connected to an external processor executing a suitable software program. It is noted that the software switched functions of a communication system may be completely controlled externally through the external processor executing a suitable software program therein as described.

Next, we describe an embodiment of a communication system according to the present invention, which is related to the embodiment illustrated in FIG. 5. In particular, this embodiment includes a communication system similar to communication system 220 shown in FIG. 5 or communication system 200 shown in FIG. 2 for exchanging data and information between networks. As before, the communication system can be an integrated system supporting transparent exchanges between networks. Comprising the communication system are first interfacing means, second interfacing means, shared non-switched means for connecting, and processing means. The first interfacing means is provided for interfacing with a first network in order to exchange data in a first network format with the first network. Further, the second interfacing means provides for interfacing with a second network so as to exchange data in a second network format with the second network. Shared non-switched means for connecting the first interfacing means and the second interfacing means are also provided. In addition, the communication system includes processing means for translating between at least one network format, such as between one of the first network format and the second network format, and a third format. The processing means are operably connected to at least one of the first interfacing means, the second interfacing means, and the shared non-switched means for connecting. Data received into one interfacing means is translated from the network format as received from the one network into a third format for software switched transmission from the one interfacing means directly to the other interfacing means. Those skilled in the art are referred to descriptions of the communication systems provided in this disclosure, with emphasis on the similar communication system embodiments described in relation to FIG. 5, in order to construe the structure and meaning of the various means and terminology used in this embodiment.

In a further related embodiment, the processing means translates data from the network format as received into the third format for software switched transmission from one interfacing means to directly to the other interfacing means. Additionally, the one interfacing means receiving data may include the processing means therein, for translating data into the third format. Data received into the one interfacing means may be transmitted in the third format to the other interfacing means through the shared non-switched means for connecting interfacing means. Optionally, once data in the third format is transmitted to the other interfacing means, the data can be translated into the other network format for transmission to the other network. For a related embodiment, the third format may comprise an encapsulated hardware format for the transmission of data directly between interfacing means, through the shared non-switched means for connecting interfacing means. A related embodiment of the communication system further comprises second processing means. The second processing means may be operably connected to at least one of the first interfacing means, the second interfacing means, the processing means, and the shared non-switched means for connecting. Accordingly, one of the processing mearis and the second processing means can perform the required data format translations, while the other of the processing means and the second processing means can establish software switched transmissions of data directly between the interfacing means. Again, the functions can be supported statically or dynamically by the processing means. Yet another related embodiment provides that software switched transmission further comprises transmitting data directly between interfacing means, independently of the processing means, after the processing means establishes a logical connection between interfacing means. As before, the processing means can de-establish the logical connection established between interfacing means.

Another embodiment of a communication system according to the present invention, which is related to the embodiment illustrated in FIG. 11, will be described. Specifically, this embodiment includes a communication system similar to communication system 240 shown in FIG. 11 or communication system 200 shown in FIG. 2 for exchanging data and information between networks. As noted above, the communication system can be an integrated system supporting externally controlled exchanges of data and information between networks. The communication system comprises first interfacing means, second interfacing means, and processing means. The first interfacing means is provided for interfacing with a first network in order to exchange data in a first network format with the first network. Similarly, the second interfacing means provides for interfacing with a second network so as to exchange data in a second network format with the second network. The first interfacing means and second interfacing means are operably connected together. Further, the processing means for processing information further comprises external interfacing means. The processing means is operably connected to at least one of the first interfacing means, the second interfacing means, and the external interfacing means. In addition, the processing means can receive interfacing means connection information from at least one of the external interfacing means, the first interfacing means, and the second interfacing means. The processing means can use the interfacing means connection information for establishing software switched logical connecting means between the first interfacing means and the second interfacing means. Significantly, the processing means can establish software switched logical connecting means automatically and without intervention from a user of the communication system. Data received by one interfacing means is transmitted directly between the one interfacing means receiving data and the other interfacing means, through the software switched logical connecting means established therebetween. The data can be transmitted between interfacing means without further intervention from the processing means, after the software switched logical connecting means has been established between the respective interfacing means. Further, those skilled in the art are referred to descriptions of the communication systems provided in this disclosure, with emphasis on the similar communication system embodiments described in relation to FIG. 11, in order to construe the structure and meaning of the terminology and various means used in this embodiment.

In another related embodiment, the data received by the one interfacing means is translated by one of the processing means and the interfacing means receiving the data into a hardware encapsulated format for transmission to the other interfacing means. Optionally, data transmitted in the hardware encapsulated format to the other interfacing means is converted into the other network format for transmission to the other network. An embodiment of the communication system further comprises second processing means. The second processing means is operably connected to at least one of the first interfacing means, the second interfacing means, the processing means, and the external interfacing means. One of the processing means and the second processing means performs data format translations, while the other of the processing means and the second processing means establishes software switched logical connecting means between interfacing means for transmitting data directly therebetween. For yet another embodiment, the communication system further comprises shared non-switched means for operably connecting the first interfacing means and the second interfacing means are also provided. Additionally in this embodiment, the software switched logical connecting means between the first interfacing means and the second interfacing means may optionally be established through the shared non-switched means for operably connecting the interfacing means. In a related embodiment, the communication system further comprises external processing means. The external processing means may be operably connected to at least one of the first interfacing means, the second interfacing means, and the external interfacing means. Accordingly, the external processing means executes a software program therein for sending interfacing means connection information to the processing means, so that the processing means can establish software switched logical connecting means between the first interfacing means and the second interfacing means. In addition, the software switched logical connecting means can be de-established by the processing means, in some related embodiments.

Many modifications and other embodiments of the present invention will come to mind to one skilled in the art to which this invention pertains having the benefit of the teachings presented in the foregoing descriptions and the associated figures. Therefore, it is to be understood that the invention is not to be limited to the specific embodiments disclosed and that modifications and other embodiments are intended to be included within the scope of the appended claims. In addition, those skilled in the art will appreciate that various features and aspects of the above disclosed embodiments, whether preferred or not, may be combined to create a number of other related embodiments that are still within the scope of the present invention. As noted, the above written description of the present invention is meant to disclose and fully describe the present invention, and is not meant to limit or narrow the present invention defined by the following claims. Although specific terms are employed herein, they are used in a generic and descriptive sense only and not for purposes of limiting the scope of the present invention in any way.

What is claimed is:

1. A communications system for exchanging data between networks, comprising:
    a first network interface connected to a first network and exchanging data in a first network format with the first network;
    a second network interface connected to a second network and exchanging data in a second network format with the second network;
    a shared non-switched system bus operably connecting the first network interface and the second network interface; and
    a processor operably connected to at least one of the first network interface, the second network interface, and the shared non-switched system bus,
    the processor executing a software program therein for translating between at least one network format and a third format;
    wherein data received into one network interface is translated from the network format as received from the one network into a third format,
    the third format suitable for externally controlled software switched transmission from the one network interface directly to the other network interface by using network interface connection information represented as data received from at least one of the network interfaces indicating that at least two network interfaces are to exchange data therebetween.

2. The communications system of claim 1, wherein the data received by the one network interface in one network format is translated into the third format by at least one of the processor and the one network interface receiving data.

3. The communications system of claim 1, wherein the processor is operably connected to both network interfaces for translating data between the one network format as received and the third format for transmission between network interfaces and for translating data between the third format and the other network format for transmission to the other network.

4. The communications system of claim 1, wherein the one network interface receiving data includes the processor therein for translating data received into the third format.

5. The communications system of claim 1, wherein at least one of the first network interface and the second network interface include one or more components selected from the group consisting of a physical interface mechanism, specialized interface hardware, an integrated interface controller, optional bus interface logic, and the processor.

6. The communications system of claim 1, wherein the first network format comprises at least one of a network protocol and a network transport associated with the first network and wherein the second network format comprises at least one of a network protocol and a network transport associated with the second network.

7. The communications system of claim 1, wherein data in the third format transmitted to the other network interface is translated into the other network format for transmission to the other network.

8. The communications system of claim 1, wherein the processor further comprises an external interface, wherein the processor receives network interface connection information from at least one of the first network interface, the second network interface, and the external interface, and wherein the processor uses the network interface connection information for supporting software switched transmission from one network interface directly to the other network interface.

9. The communications system of claim 1, wherein the data received from one network interface is transmitted in the third format to the other network interface through the shared non-switched system bus.

10. The communications system of claim 1, wherein the shared non-switched system bus comprises a PCI bus and wherein the third format comprises an encapsulated PCI bus format for transmission of data to the other network interface.

11. The communications system of claim 10, wherein at least one of the first network and the second network comprises an IP network, and wherein the third format comprises an IP packet encapsulated in a PCI bus format for transmission between one network interface and the other network interface.

12. The communications system of claim 11, wherein the data transmitted in the encapsulated PCI bus format is further translated into the other network format for transmission to the other network.

13. The communications system of claim 12, wherein software switched transmission of data in the third format comprises establishing a software switched logical hardware connection across the PCI bus between the one network interface and the other network interface for transmitting data in the third format therebetween.

14. The communications system of claim 13, wherein the software switched logical hardware connection comprises establishing at least one PCI memory mapped connection between network interfaces through the PCI bus selected from the group consisting of master to target PCI bus memory access cycles, bi-directional PCI bus memory access cycles, master to target PCI bus DMA access cycles, and bi-directional PCI bus DMA access cycles, for transmitting data directly between network interfaces through the PCI bus.

15. The communications system of claim 14, wherein software switched transmission further comprises transmitting data directly between network interfaces through the PCI bus independently of the processor after establishing the software switched logical connection between network interfaces.

16. The communications system of claim 1, wherein data in the third format is translated into the other network format by at least one of the processor and the other network interface.

17. The communications system of claim 1, wherein the other network interface receiving data in the third format includes the processor therein for translating data received in the third format into the other network format for transmission to the other network.

18. The communications system of claim 1, wherein the data translation is performed by the processor, and wherein the translation performed by the processor comprises at least one of conversion from the one network format as received into the third format and conversion from the third format into the other network format for transmission to the other network.

19. The communications system of claim 1, further comprising a second processor operably connected to at least one of the first network interface, the second network interface, the shared non-switched system bus, and the processor, wherein one of the processor and the second processor performs data format translations and the other of the processor and the second processor establishes software switched data transmissions directly between network interfaces.

20. The communications system of claim 1, wherein software switched transmission of data between network interfaces is established by at least one of the processor, the one network interface receiving data, and the other network interface.

21. The communications system of claim 1, wherein software switched transmission of data in the third format comprises the processor establishing a logical hardware connection between the one network interface and the other network interface for transmitting data in the third format directly between network interfaces.

22. The communications system of claim 21, wherein the logical hardware connection is selected from the group consisting of a hardware connection between network interfaces, a memory mapped connection between network interfaces, a memory mapped connection between network interfaces established through the shared non-switched system bus, and a DMA memory mapped connection between network interfaces established through the shared non-switched system bus.

23. The communications system of claim 22, wherein the logical hardware connection between network interfaces provides at least one of a unidirectional data transfer between network interfaces and a bi-directional data transfer between network interfaces.

24. The communications system of claim 21, wherein software switched transmission further comprises transmission of data directly through the logical hardware connection between network interfaces independently of the processor after the processor establishes the logical hardware connection between network interfaces.

25. The communications system of claim 21, wherein software switched transmission of data further comprises the processor de-establishing the logical hardware connection established between network interfaces.

26. A communications system for exchanging data between networks, comprising:
a first network interface connected to a first network and exchanging data in a first network format with the first network;

a second network interface connected to a second network and exchanging data in a second network format the second network, the first network interface and the second network interface operably connected; and a processor executing a computer software program therein, the processor further comprising an external interface and operably connected to at least one of the first network interface, the second network interface, and the external interface;

wherein the processor receives network interface connection information from at least one of the external interface, the first network interface, and the second network interface, wherein the processor uses the network interface connection information received indicating that at least two network interfaces are to exchange data for automatically establishing an externally controlled software switched logical connection without user intervention between the first network interface and the second network interface, and wherein data received by one network interface is transmitted directly between the one network interface and the other network interface through the software switched logical connection without further processor intervention.

27. The communications system of claim 26, wherein the first network format comprises at least one of a network protocol and a network transport associated with the first network and wherein the second network format comprises at least one of a network protocol and a network transport associated with the second network.

28. The communications system of claim 26, wherein the external interface of the processor is an interface selected from the group consisting of the first network interface, the second network interface, and an interface independent of the first and second network interfaces.

29. The communications system of claim 26, wherein at least one of the first network interface, the second network interface, and the external interface include one or more components selected from the group consisting of a physical interface mechanism, specialized interface hardware, an integrated interface controller, optional bus interface logic, and the processor.

30. The communications system of claim 26, wherein data received by the one network interface is translated by at least one of the processor and the one network interface from the one network format as received into a hardware encapsulated format for transmission to the other network interface.

31. The communications system of claim 26, wherein data received by the one network interface is translated from the one network format as received into a hardware encapsulated format for transmission to the other network interface.

32. The communications system of claim 31, wherein data in the hardware encapsulated format transmitted to the other network interface is translated into the other network format for transmission to the other network.

33. The communications system of claim 31, further comprising a second processor operably connected to at least one of the first network interface, the second network interface, the external interface, and the processor, wherein one of the processor and the second processor performs data format conversions between network formats and the hardware encapsulated format, and wherein the other of the processor and the second processor establishes software switched logical connections between network interfaces for directly transmitting data therebetween.

34. The communications system of claim 31, wherein the translated data in the hardware encapsulated format is transmitted directly from the one network interface to the other network interface through the software switched logical connection established therebetween.

35. The communications system of claim 26, further comprising a shared non-switched system bus, wherein the first network interface and the second network interface are operably connected through the shared non-switched system bus.

36. The communications system of claim 35, wherein the software switched logical connection between the first network interface and the second network interface is established through the shared non-switched system bus.

37. The communications system of claim 35, wherein the shared non-switched system bus comprises a PCI bus and wherein the data received in the one network format is translated into a hardware encapsulated format for transmission between the one network interface and the other network interface across the PCI bus.

38. The communications system of claim 37, wherein at least one of the first network and the second network comprises an IP network, and wherein the hardware encapsulated format comprises an IP packet encapsulated in a PCI bus format for transmission between the one network interface and the other network interface.

39. The communications system of claim 37, wherein the software switched logical connection established between the one network interface and the other network interface comprises establishing at least one memory mapped PCI bus transfer selected from the group consisting of a unidirectional PCI bus transfer, a bi-directional PCI bus transfer, a PCI memory access cycle, and a PCI DMA access cycle, between the first network interface and the second network interface across the PCI bus.

40. The communications system of claim 26, further comprising an external processor operably connected to at least one of the first network interface, the second network interface, and the external interface, wherein the external processor executes a software program therein for sending network interface connection information to the processor used for establishing the software switched logical connection between the first network interface and the second network interface.

41. The communications system of claim 26, wherein the processor issues commands to the at least one of the first network interface and the second interface to establish the software switched logical connection therebetween.

42. The communications system of claim 41, wherein the software switched logical connection comprises a hardware connection established by the processor under software control between the first network interface and the second network interface for transmitting data directly therebetween.

43. The communications system of claim 41, wherein the software switched logical connection comprises at least one memory mapped connection selected from the group consisting of a unidirectional logical data connection and a bi-directional logical data connection between the first network interface and the second network interface for transmitting data directly therebetween.

44. The communications system of claim 26, wherein the software switched logical connection is de-established by the processor.

45. A communications system for exchanging data between networks, comprising:
first interfacing means for interfacing with a first network to exchange data in a first network format with the with the first network;
second interfacing means for interfacing with a second network to exchange data in a second network format with the second network;
shared non-switched means for connecting the first interfacing means and the second interfacing means; and
processing means for translating between at least one network format and a third format,
the processing means operably connected to at least one of the first interfacing means, the second interfacing means, and the shared non-switched means for connecting;
wherein data received into one interfacing means is translated from the network format as received from the one network into a third format,
the third format suitable for externally controlled software switched transmission from the one interfacing means directly to the other interfacing means by using interfacing means connection information represented as data received from at least one of the interfacing means indicating that at least two interfacing means are to exchange data therebetween.

46. The communications system of claim 45, wherein the processing means translates data from the network format as received into the third format for software switched transmission from the one interfacing means directly to the other interfacing means.

47. The communications system of claim 45, wherein the one interfacing means receiving data includes the processing means therein for translating data into the third format.

48. The communications system of claim 45, wherein data received into the one interfacing means is transmitted in the third format to the other interfacing means through the shared non-switched means for connecting interfacing means.

49. The communications system of claim 45, wherein data transmitted in the third format to the other interfacing means is translated into the other network format for transmission to the other network.

50. The communications system of claim 48, wherein the third format comprises an encapsulated hardware format for the transmission of data directly between interfacing means through the shared non-switched means for connecting interfacing means.

51. The communications system of claim 45, further comprising second processing means operably connected to at least one of the first interfacing means, the second interfacing means, the processing means, and the shared non-switched means for connecting, wherein one of the processing means and the second processing means performs data format translations and wherein the other of the processing means and the second processing means establishes software switched transmission of data directly between the interfacing means.

52. The communications system of claim 45, wherein software switched transmission further comprises transmission of data directly between interfacing means independently of the processing means after the processing means establishes a logical connection between interfacing means.

53. The communications system of claim 52, wherein the processing means de-establishes the logical connection established between interfacing means.

54. A communications system for exchanging data between networks, comprising:
first interfacing means for interfacing to a first network and exchanging data in a first network format with the first network;

second interfacing means for interfacing to a second network and exchanging data in a second network format the second network, the first interfacing means and the second interfacing means operably connected; and processing means for processing information, the processing means further comprising external interfacing means, the processing means operably connected to at least one of the first interfacing means, the second interfacing means, and the external interfacing means;

wherein the processing means receives interfacing means connection information from at least one of the external interfacing means, the first interfacing means, and the second interfacing means, wherein the processing means uses the interfacing means connection information indicating that at least two interfacing means are to exchange data for automatically and without user intervention establishing externally controlled software switched logical connection means between the first interfacing means and the second interfacing means, and wherein data received by one interfacing means is transmitted directly between the one interfacing means and the other interfacing means through the software switched logical connection means without further processing means intervention.

55. The communications system of claim 54, wherein data received by the one interfacing means is translated by at least one of the processing means and the one interfacing means into a hardware encapsulated format for transmission to the other interfacing means.

56. The communications system of claim 55, wherein data transmitted in the hardware encapsulated format to the other interfacing means is translated into the other network format for transmission to the other network.

57. The communications system of claim 54, further comprising second processing means operably connected to at least one of the first interfacing means, the second interfacing means, the processing means, and the external interfacing means, wherein one of the processing means and the second processing means performs data format translations and the other of the processing means and the second processing means establishes software switched logical connection means between interfacing means for transmitting data directly therebetween.

58. The communications system of claim 54, further comprising shared non-switched means for connecting the first interfacing means and the second interfacing means.

59. The communications system of claim 58, wherein the software switched logical connection means between the first interfacing means and the second interfacing means is established through the shared non-switched means for connecting the interfacing means.

60. The communications system of claim 54, further comprising external processing means operably connected to at least one of the first interfacing means, the second interfacing means, and the external interfacing means, wherein the external processing means executes a software program therein for sending interfacing means connection information to the processing means for establishing software switched logical connection means between the first interfacing means and the second interfacing means.

61. The communications system of claim 54, wherein the software switched logical connection means is de-established by the processing means.

\* \* \* \* \*